US011730239B2

(12) United States Patent
Takakuwa et al.

(10) Patent No.: US 11,730,239 B2
(45) Date of Patent: Aug. 22, 2023

(54) TOUCH FASTENER AND METHOD OF MANUFACTURING THE SAME

(71) Applicant: KURARAY FASTENING CO., LTD., Osaka (JP)

(72) Inventors: Kazunori Takakuwa, Sakai (JP); Satoru Ono, Sakai (JP); Yoshikatsu Fujisawa, Sakai (JP); Etsunori Fujita, Hiroshima (JP)

(73) Assignee: KURARAY FASTENING CO., LTD., Osaka (JP)

( * ) Notice: Subject to any disclaimer, the term of this patent is extended or adjusted under 35 U.S.C. 154(b) by 449 days.

(21) Appl. No.: 15/733,143

(22) PCT Filed: Nov. 28, 2018

(86) PCT No.: PCT/JP2018/043859
§ 371 (c)(1),
(2) Date: May 28, 2020

(87) PCT Pub. No.: WO2019/107444
PCT Pub. Date: Jun. 6, 2019

(65) Prior Publication Data
US 2021/0100323 A1    Apr. 8, 2021

(30) Foreign Application Priority Data
Nov. 29, 2017 (JP) .................. 2017-229706

(51) Int. Cl.
*A44B 18/00* (2006.01)
*B29C 48/12* (2019.01)
(Continued)

(52) U.S. Cl.
CPC ...... *A44B 18/0049* (2013.01); *B29C 48/0018* (2019.02); *B29C 48/0022* (2019.02);
(Continued)

(58) Field of Classification Search
CPC ............ A44B 18/0049; A44B 18/0061; A44B 18/0073; A44B 18/0076; A44B 18/0046;
(Continued)

(56) References Cited

U.S. PATENT DOCUMENTS 5,688,576 A    11/1997 Ohno et al.
7,014,906 B2 *  3/2006 Tuman ............... A44B 18/0015
                                                428/100
(Continued)

FOREIGN PATENT DOCUMENTS

JP    4991285    8/2012
JP    4991301    8/2012
(Continued)

OTHER PUBLICATIONS

International Search Report dated Jan. 29, 2019 in PCT/JP2018/043859 with English translation, 3 pages.
Written Opinion dated Jan. 29, 2019 in PCT/JP2018/043859.

*Primary Examiner* — Robert Sandy
*Assistant Examiner* — Louis A Mercado
(74) *Attorney, Agent, or Firm* — Grüneberg and Myers, PLLC

(57) ABSTRACT

There is provided a touch fastener that has high followability to the relative movement of portions to be engaged and does not easily separate from a mating member, and thus is usable in a wider range of applications. In the touch fastener, all the elements, that is, first strands, second strands, and engagement elements are formed of a thermoplastic elastomer. Further, the plurality of first strands and the plurality of second strands are disposed to intersect with each other, and consequently, hole portions each surrounded by the two adjacent first strands and the two adjacent second strands are provided. Accordingly, it has a high elastic function, easily (Continued)

stretches, and has high followability to the relative movement of portions to be engaged.

13 Claims, 17 Drawing Sheets

(51) Int. Cl.
*B29C 48/00* (2019.01)
*B29K 67/00* (2006.01)
*B29L 31/00* (2006.01)

(52) U.S. Cl.
CPC .......... *B29C 48/12* (2019.02); *B29K 2067/00* (2013.01); *B29L 2031/729* (2013.01)

(58) Field of Classification Search
CPC .......... A44B 18/008; Y10T 428/24017; B29C 48/0018; B29C 48/0022; B29C 48/07; B29C 48/12; B29C 48/13; B29C 55/06; B29C 2793/0036; B29C 2793/0063; B29K 2067/00; B29L 2031/729
See application file for complete search history.

(56) References Cited

U.S. PATENT DOCUMENTS

| | | | | |
|---|---|---|---|---|
| 7,235,202 | B2* | 6/2007 | Seth | B29D 28/00 264/145 |
| 7,241,483 | B2* | 7/2007 | Ausen | A44B 18/0065 428/137 |
| 7,258,705 | B2* | 8/2007 | Woo | B24D 11/02 451/526 |
| 7,622,180 | B2* | 11/2009 | Seth | A61F 13/15707 24/442 |
| 7,678,316 | B2* | 3/2010 | Ausen | B29C 48/21 428/137 |
| 8,399,086 | B2* | 3/2013 | Itoh | A44B 18/0076 428/100 |
| 9,649,824 | B2* | 5/2017 | Chandrasekaran | B32B 5/022 |
| 9,944,764 | B2* | 4/2018 | Chandrasekaran | A61F 13/625 |
| 2004/0170801 | A1 | 9/2004 | Seth et al. | |
| 2004/0170802 | A1 | 9/2004 | Seth et al. | |
| 2005/0079321 | A1* | 4/2005 | Tuman | A61F 13/625 428/100 |
| 2007/0210477 | A1* | 9/2007 | Seth | A44B 18/0049 264/148 |

FOREIGN PATENT DOCUMENTS

| | | |
|---|---|---|
| WO | 2004/077980 | 9/2004 |
| WO | 2005/037005 | 4/2005 |

* cited by examiner (a)

(b)

TOUCH FASTENER AND METHOD OF MANUFACTURING THE SAME

This application is a National Stage entry under § 371 of International Application No. PCT/JP2018/043859, filed on Nov. 28, 2018, the entirety of which is incorporated herein by reference, and which claims the benefit of Japanese Application No. 2017-229706, filed on Nov. 29, 2017, the entirety of which is incorporated herein by reference.

TECHNICAL FIELD

The present invention relates to a touch fastener and a method of manufacturing the same, in particular to a mesh-type touch fastener having many hole portions and a method of manufacturing the same.

BACKGROUND ART

Patent Documents 1 and 2 disclose a mesh-type (or net-type) touch fastener including: a first set of a plurality of plastically deformed thermoplastic strands; and a second set of a plurality of strands formed integrally with the first set of strands and not present on the same plane as the first set of strands, wherein hooks are provided on at least one of the first set of strands and the second set of strands. This touch fastener is made of a synthetic resin yet is excellent in breathability.

PRIOR ART DOCUMENT

Patent Document

Patent Document 1: Japanese Patent No. 4991285
Patent Document 2: Japanese Patent No. 4991301

DISCLOSURE OF THE INVENTION

Problems to be Solved by the Invention

The mesh-type touch fasteners disclosed in Patent Documents 1 and 2 are formed using a thermoplastic resin such as a polyolefin-based resin, polyvinyl chloride, polystyrene, nylon, or polyethylene terephthalate. However, because these resins are inelastic polymer materials, the manufactured touch fasteners are poor in elasticity or stretchability. Therefore, in a case where they are used in applications where relative movement of portions to be engaged occurs in various directions, for example, in cases where they are used for fixing members in a moving body such as an automobile (for example, fixing a cushioning member and an outer layer member of a seat), joining tongue pieces on the right and left sides of a foot insertion portion in a shoe instep, and wrapping a supporter around an arm or leg, in particular, in a case where a large impact load is applied, the touch fasteners disclosed in Patent Documents 1 and 2 do not have sufficient followability and may be easily damaged, resulting in easy disengagement between the engagement elements and a mating member (if the engagement elements are hooks, the mating member is a loop member). Patent Documents 1 and 2 also describe that one of a base layer forming the strands, ribs, and the engagement elements is made as an elastic layer by coextrusion or the like. However, all of the forms disclosed specifically as examples are combinations with an inelastic layer, and thus cannot fully exhibit an elastic function, and there is room for improvement in followability to the relative movement of the portions to be engaged.

The present invention was made in consideration of the above, and has an object to provide a touch fastener that not only is excellent in breathability but also has high followability to the relative movement of portions to be engaged and does not easily separate from a mating member, and thus is usable in a wider range of applications, and to provide a method of manufacturing the same.

Means for Solving the Problems

To solve the above problem, the present invention provides a mesh-type touch fastener including:

A plurality of first strands arranged at intervals from one another and substantially in parallel to one another;

A plurality of second strands projecting from the first strands outward in a thickness direction of the first strands, extending along a direction intersecting with a longitudinal direction of the first strands, and arranged at intervals from one another and substantially in parallel to one another; and engagement elements projecting from the first strands to an opposite side of the second strands, wherein the first strands, the second strands, and the engagement elements are integrally molded of a thermoplastic elastomer.

Adoptable is a configuration in which the second strands each include: a stem extending along a direction intersecting with the longitudinal direction of the first strands; and a cap portion projecting to both sides of the stem at an end portion of the stem, and A thickness of the cap portions is smaller than a thickness of the first strands.

In this case, preferably, the thickness of the cap portions is in a range of ½ to ¼ of the thickness of the first strands.

Adoptable is a configuration in which the second strands each include: a stem extending along a direction intersecting with the longitudinal direction of the first strands; and a cap portion projecting to both sides of the stem at an end portion of the stem, and A thickness of the cap portions is equal to or more than the first strands.

In this case, preferably, the thickness of the cap portions is in a range of one to four times the thickness of the first strands.

Preferably, an inclination angle of the first strands to a virtual line orthogonal to the second strands is in a range of 0 to 70 degrees.

Also adoptable is a configuration in which, in a tensile shear test in which a test piece having a length of 170 mm along a longitudinal direction of the second strands and a width of 20 mm is pulled in a shear direction at 100 mm/min by a tensile testing machine while a 50 mm length along the longitudinal direction of the second strands from one edge of the test piece is engaged with a mating member through the engagement elements, a measured displacement amount of the test piece along the longitudinal direction of the second strands up to an instant when a load value in the shear direction due to the engagement of the test piece and the mating member sharply drops is 70% or more of a total length that the test piece has before being pulled.

Also adoptable is a configuration in which a breaking-time load value when the test piece by itself was pulled along the longitudinal direction of the second strands at 100 mm/min by the tensile testing machine is 1.5 times or less a load value at the instant when the load value in the shear direction due to the engagement of the test piece and the mating member sharply drops in the tensile shear test.

Preferably, the thermoplastic elastomer is a thermoplastic polyester elastomer.

The touch fastener can be formed integrally with a cushioning member of a seat to be used.

The present invention further provides a method of manufacturing a touch fastener, the touch fastener including:

A plurality of first strands arranged at intervals from one another and substantially in parallel to one another;

A plurality of second strands projecting from the first strands outward in a thickness direction of the first strands, extending along a direction intersecting with a longitudinal direction of the first strands, and arranged at intervals from one another and substantially in parallel to one another; and engagement elements projecting from the first strands to an opposite side of the second strands, the method comprising:

A step of extrusion-molding a sheet-shaped molded body having a base layer substantially in a flat plate shape, one-side ribs extending along an extrusion direction on one surface of the base layer, and other ribs extending along the extrusion direction on the other surface of the base layer;

A step of making cuts from tops of the other ribs down to a boundary position with the one-side ribs in the base layer, the cuts extending along a width direction orthogonal to the extrusion direction or along a direction inclined at a predetermined angle to the width direction and being a predetermined-interval spaced from one another in the extrusion direction; and A step of stretching the sheet-shaped molded body in the extrusion direction to form the first strands by portions, of the base layer, which are separated at positions of the cuts, form the second strands by the one-side ribs, and form the engagement elements by portions, of the other ribs, which are separated at the positions of the cuts, and the method extrusion-molding the one-side ribs such that the one-side ribs each have a shape including a portion which is to form a stem of the second strand and a portion which is to form a cap portion projecting to both sides at an end portion of the stem, and manufacturing touch fasteners different in tear strength in a direction substantially orthogonal to the extrusion direction by varying a thickness of the portions which are to form the cap portions at the time of the extrusion molding.

In this case, the manufacture can be performed such that the thickness of the portions, of the one-side ribs, which are to form the cap portions of the second strands is made smaller than a thickness of the base layer which is to be the first strands.

Further, the manufacture can be performed such that the thickness of the portions, of the one-side ribs, which are to form the cap portions of the second strands is made equal to or more than a thickness of the base layer which is to be the first strands.

Effect of the Invention

In the touch fastener of the present invention, all the elements, namely, the first strands, the second strands, and the engagement elements are formed of the thermoplastic elastomer. Further, the plurality of first strands and the plurality of second strands are disposed to intersect with each other, and consequently, hole portions each surrounded by the two adjacent first strands and the two adjacent second strands are provided. Accordingly, the touch fastener has a high elastic function, easily stretches, and has high followability to the relative movement of the portions to be engaged.

Further, according to the method of manufacturing the touch fastener of the present invention, when the sheet-shaped molded body is extruded, by varying the thickness of the portions, of the one-side ribs, which are to form the cap portions of the second strands, it is possible to manufacture touch fasteners different in tear strength in the direction substantially orthogonal to the extrusion direction.

DESCRIPTION OF EMBODIMENTS

Figure 1:
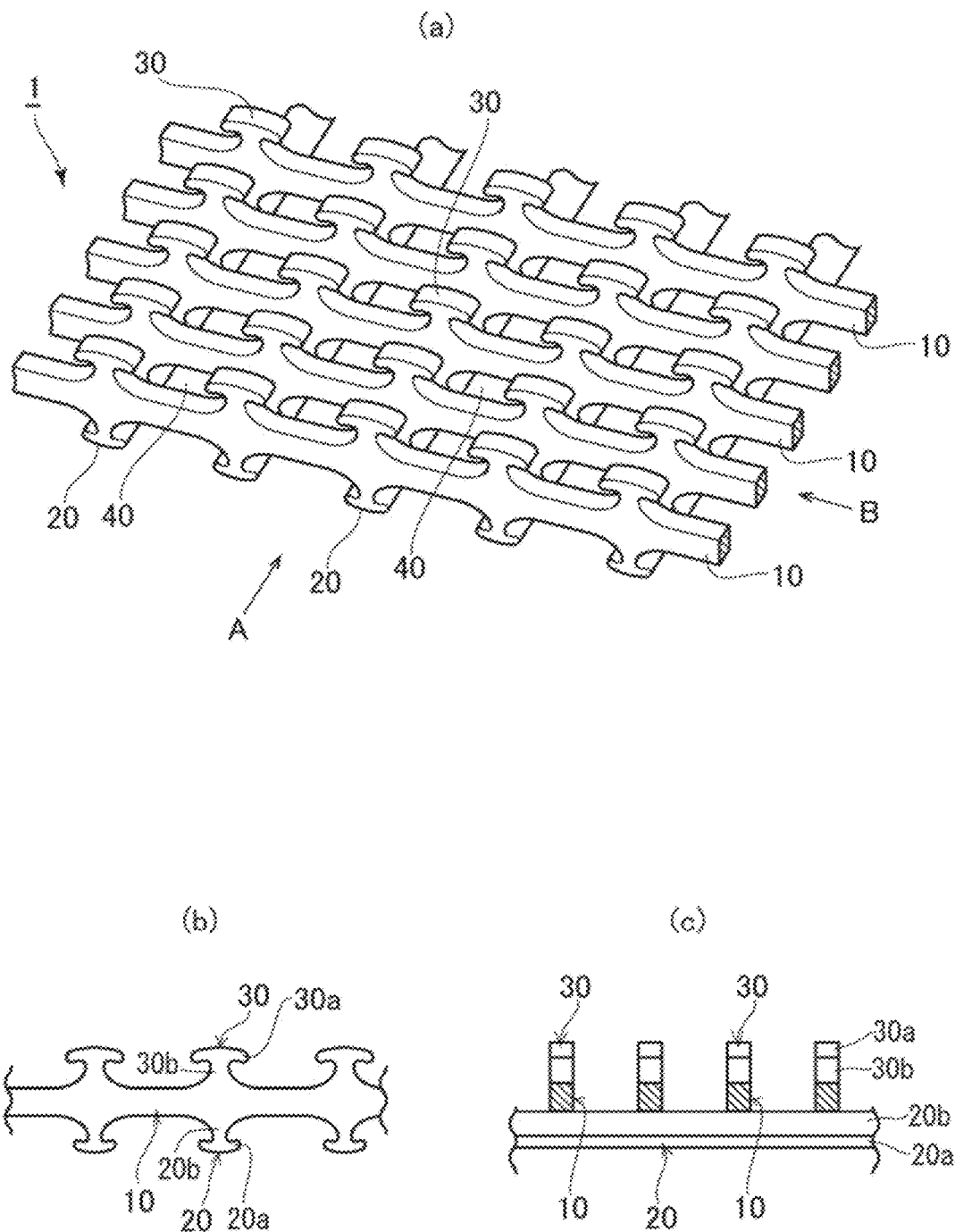
FIG. 1(a) is a perspective view illustrating a touch fastener according to one embodiment of the present invention.
FIG. 1(b) is a view seen from the arrow A direction in FIG. 1(a)
FIG. 1(c) is a view seen from the arrow B direction in FIG. 1(a).
Figure 2:
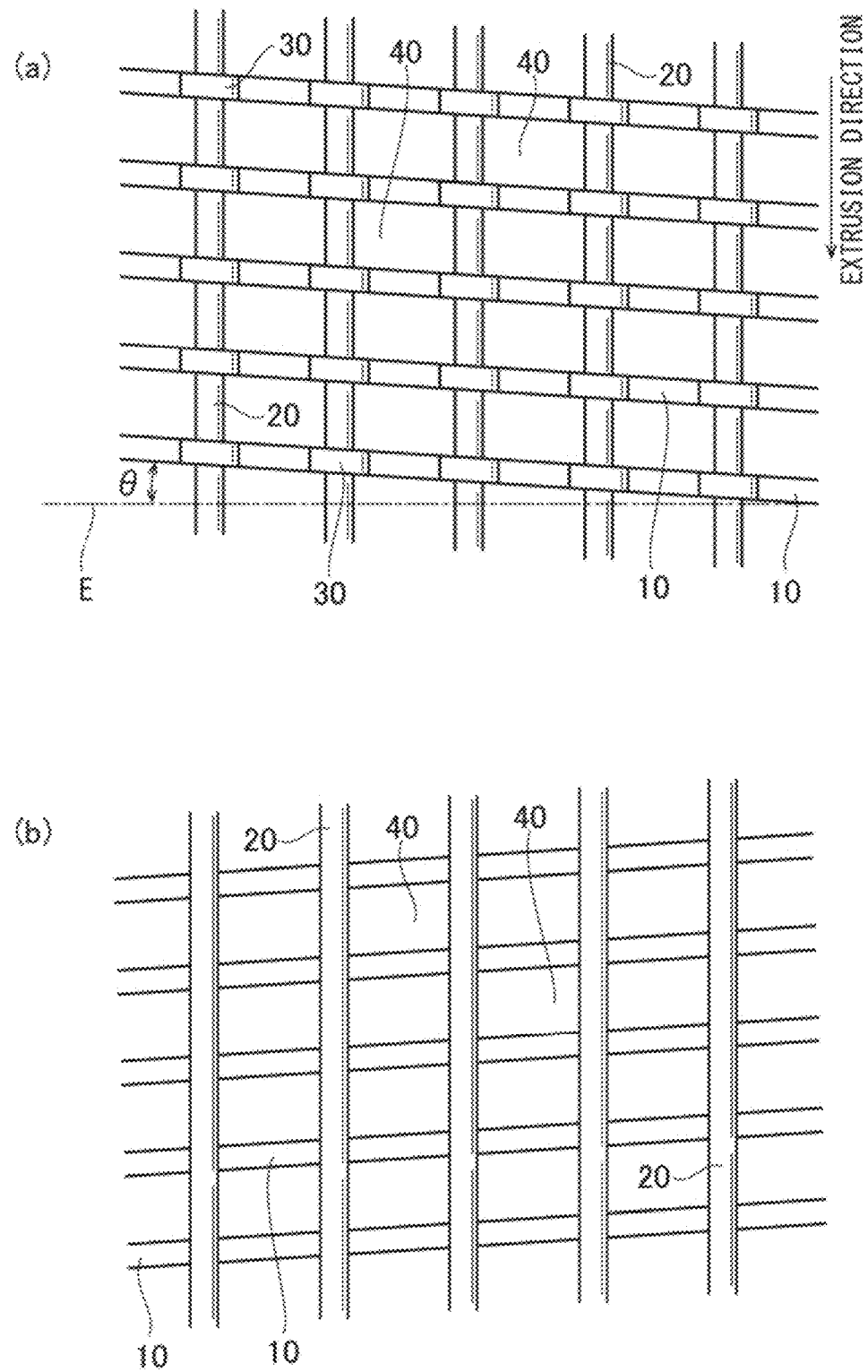
FIG. 2(a) is a plan view of the touch fastener illustrated in FIG. 1(a) seen from an engagement element side.
FIG. 2(b) is a plan view thereof seen from a second strand side.

The present invention will be hereinafter described in more detail based on an embodiment illustrated in the drawings. FIG. 1 and FIG. 2 are views illustrating a touch fastener 1 according to one embodiment of the present invention. As illustrated in these drawings, the touch fastener 1 includes first strands 10, second strands 20, and engagement elements 30. The touch fastener 1 is formed using a sheet-shaped molded body 100 (see FIG. 3(b)) molded by an extruder. As illustrated in FIG. 3(a), a cavity portion 1100 of a molding die 1000 of the extruder has a cross-sectional shape having: a middle space portion 1110 provided at its up-down direction middle position and having a predetermined width in the width direction (in a direction orthogonal to an extrusion direction) and a height of several mm or less; a plurality of downward projecting space portions 1120 projecting downward from the middle space portion 1110 and formed to be predetermined-interval spaced from one another in the width direction of the middle space portion 1110; and upward projecting space portions 1130 projecting upward to an opposite side of the downward projecting space portions 1120, and when a molding material is put therein to be extruded, a base layer 110 in a substantially flat plate shape is extruded from the middle space portion 1110, and lower surface-side ribs 120 which are one-side ribs and upper surface-side ribs 130 which are the other ribs are extruded from the downward projecting space portions 1120 and the upward projecting space portions 1130 respectively as illustrated in FIG. 3(b). Consequently, the sheet-shaped molded body 100 is formed in which the base layer 110 is integrated with the lower surface-side ribs 120 being the one-side ribs extending in the extrusion direction on one surface of the base layer 110 and the upper surface-side ribs 130 being the other ribs extending in the extrusion direction on the other surface of the base layer 110. Note that the upper surface-side ribs 130 are to form the engagement elements 30 constituted by hooks and each having, at a tip thereof, a flange portion 30a (see FIG. 1(b)) projecting outward in the width direction, for instance. Therefore, the cross-sectional shape of each of the upper surface-side ribs 130, in other words, the cross-sectional shape of each of the upward projecting space portions 1130 of the molding die agrees with the cross-sectional shape of the engagement element 30 illustrated in FIG. 1(b), and is a shape having a portion 1130b, which corresponds to a stem 30b, extending in the upward direction from the middle space portion 1110 and a portion 1130a projecting outward at an upper end portion of the portion 1130b (see FIG. 3(a)). Note that, in this embodiment, the second strands 20 each have a shape including a stem 20b projecting downward from the first strand 10 (base layer 110) and a cap portion 20a projecting outward to both sides in the width direction of the stem 20b at a lower end portion of the stem 20b, and accordingly the downward projecting space portions 1120 each have a shape including: a portion 1120b with a relatively narrow width extending in the downward direction from the middle space portion 1110; and a portion 1120a with a wide width projecting outward to both sides in the width direction at a lower end portion of the portion 1120b. Therefore, in the lower surface-side ribs 120 being the one-side ribs extruded from the downward projecting space portions 1120, the portions 120b extruded from the narrow-width portions 1120b form the stems 20b of the second strands 20 and the portions 120a extruded from the wide-width portions 1120a form the cap portions 20a of the second strands 20.

Figure 3:
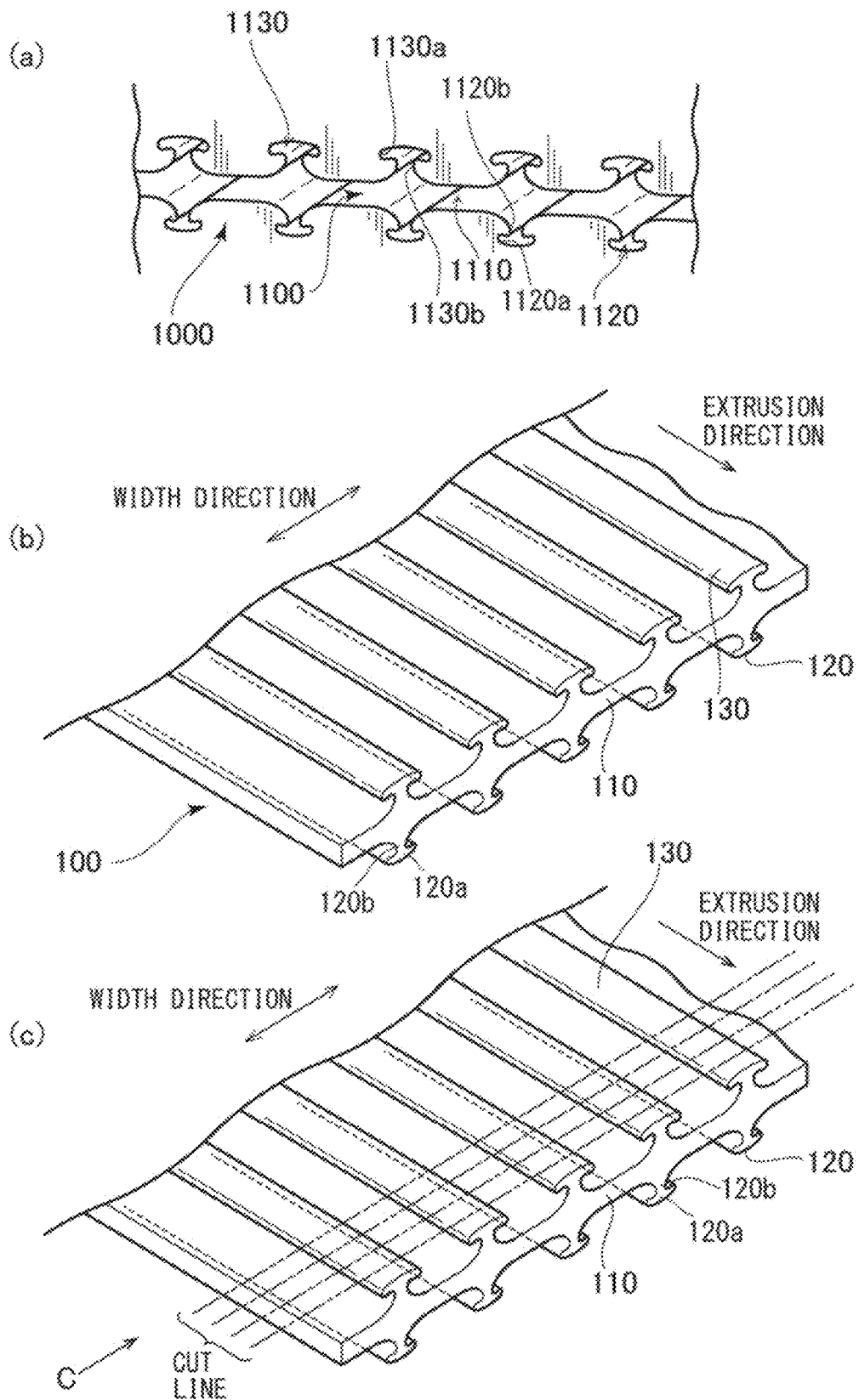
FIG. 3 are views illustrating manufacturing steps of the touch fastener according to the above embodiment, FIG. 3(a) being a view schematically illustrating a cross-sectional shape of a cavity portion of an extrusion die, FIG. 3(b) being a view illustrating a sheet-shaped molded body extruded from the cavity portion, and FIG. 3(c) being a view illustrating the positions of cuts formed in the sheet-shaped molded body.
Figure 4:
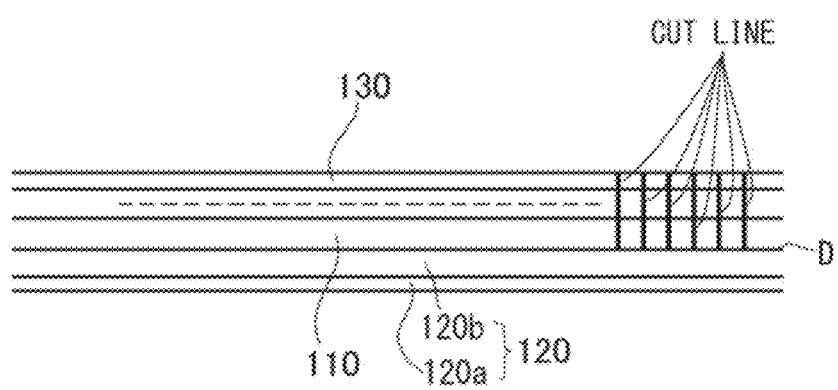
FIG. 4(a) is a view seen from the arrow C direction in FIG. 3(c)
FIG. 4(b) is an explanatory view of a stretching step.
Figure 4:
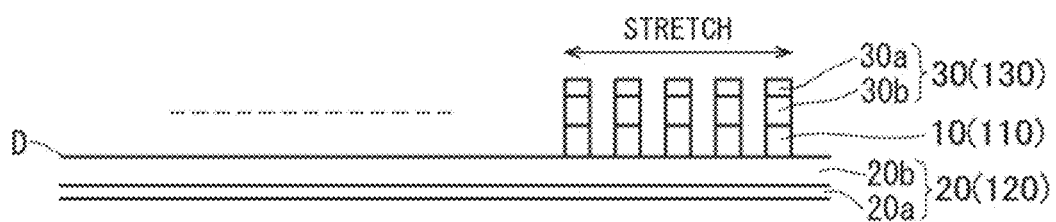

As illustrated in FIG. 3(c) and FIG. 4(a), in the extrusion-molded sheet-shaped molded body 100, cuts are made from the tops of the upper surface-side ribs 130 down to a boundary position with the lower surface-side ribs 120 in the base layer 110 (the position indicated by the sign D in FIGS. 4(a), (b)), the cuts extending along a width direction orthogonal to the extrusion direction or along a direction inclined at a predetermined angle to the width direction and being a predetermined interval spaced from one another in the extrusion direction. The direction inclined at the predetermined angle to the width direction mentioned here is, as illustrated in FIG. 2(a), the inclination angle θ to the virtual line E along the width direction orthogonal to the second strands 20. A preferable value of the inclination angle θ will be further described later.

Next, the sheet-shaped molded body 100 is stretched in the extrusion direction. Consequently, as illustrated in FIG. 4(b), the lower surface-side ribs 120 elongate in the stretching direction, while, in the upper surface-side ribs 130 and the base layer 110, owing to the cuts made therein at the predetermined intervals, portions sandwiching each of the cuts separate from one another. As a result, spaces are formed between the portions sandwiching the cuts to become hole portions 40. When the stretching is continued until the hole portions 40 come to have a predetermined size, the shape is fixed by cooling. Needless to say, at the stages of the extrusion, the stretching, and so on, appropriate heating for facilitating the working and appropriate cooling for fixing the shape after the working are applied, though not described in detail above.

Through such steps, as illustrated in FIG. 1 and FIG. 2, the portions, of the base layer 110, which are separated at the cut positions become the plurality of first strands 10 arranged at intervals from one another and substantially in parallel to one another, the lower surface-side ribs 120 become the plurality of second strands 20 extending along the direction intersecting with the longitudinal direction of the first strands 10 and arranged at intervals from one another and substantially in parallel to one another, and the portions, of the upper surface-side ribs 130, which are separated at the cut positions become the discrete engagement elements (hooks) 30. Accordingly, the engagement elements (hooks) 30 are provided to project to the opposite side of the second strands 20, with the first strands 10 (base layer 110) therebetween. Further, since the plurality of first strands 10 are arranged at intervals from one another and the plurality of second strands 20 are arranged at intervals from one another to intersect with the plurality of first strands 10, the hole portions 40 are each formed at a position surrounded by the adjacent first strands 10, 10 and the adjacent second strands 20, 20 in a plan view. Next, the sheet-shaped molded body 100 is cut into a predetermined dimension according to the application, whereby the desired mesh-type touch fastener 1 is manufactured.

Figure 5:
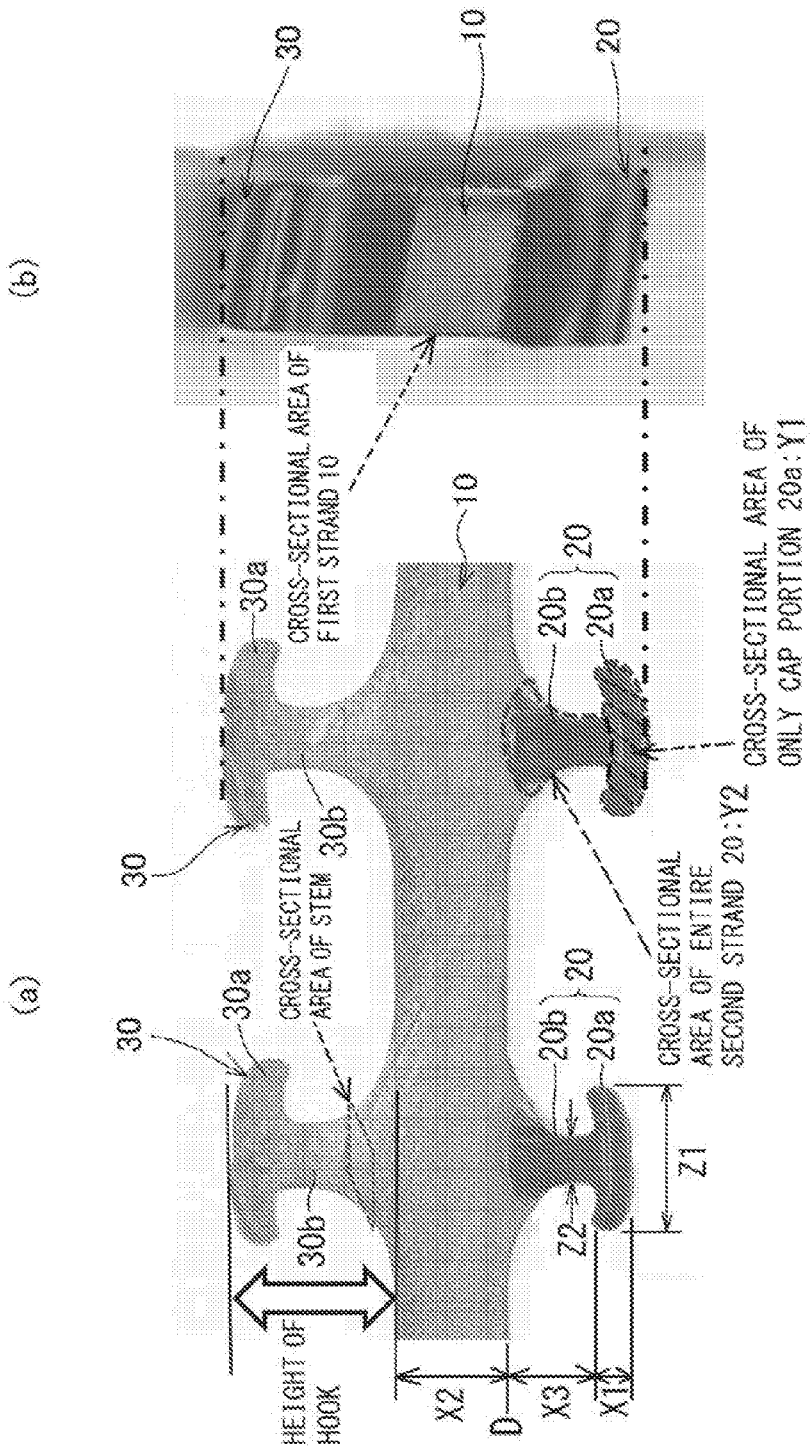
FIG. 5 are views to explain portions where the items in Tables 1 and 2 are measured.

In this embodiment, as illustrated in FIG. 1 and FIG. 3, the second strands 20 each have a shape including the stem 20b projecting downward from the first strand 10 (base layer 110) and the cap portion 20a projecting in the width direction of the stem 20b at the lower end portion of the stem 20b. However, the second strands 20 (lower surface-side ribs 120) are intended to connect the adjacent first strands 10, 10 which are separated, and thus they each may have a substantially quadrangular cross-sectional shape or the like including only the stem 20b without such a cap portion 20a. However, providing the cap portions 20a makes it possible to adjust tear strength in the direction substantially orthogonal to the longitudinal direction of the second strands 20 (extrusion direction) depending on the thickness X1 of the cap portions 20a (the length from the boundary position with the stems 20b of the second strands 20 projecting downward from the first strands 10 to the outer end surfaces of the cap portions 20a) (see FIG. 5(a)).

Later-described tests conducted in Examples have led the present inventor to the following findings. That is, with the same material and the same dimensional parameters of portions except the thickness of the cap portions 20a, there is a tendency that the thinner the thickness X1 of the cap portions 20a, the larger the elongation along the longitudinal direction of the second strands 20 and the lower the tear strength in the direction substantially orthogonal to the longitudinal direction of the second strands 20, while there is a tendency that the thicker the thickness X1 of the cap portions 20a, the smaller the elongation along the longitudinal direction of the second strands 20 and the higher the tear strength in the direction substantially orthogonal to the longitudinal direction of the second strands 20. Therefore, by varying the thickness of the cap portions 20a, it is possible to provide touch fasteners 1 different in the tear strength in the direction substantially orthogonal to the longitudinal direction of the second strands 20 (extrusion direction). In other words, by using, as the molding die 1000, one whose wide-width portions 1120a projecting outward to both sides in the width direction at the lower end portions of the downward projecting space portions 1120 have a relatively large up-down direction distance, it is possible to impart a relatively large thickness to the portions 120a at the lower end sides of the lower surface-side ribs 120 which are extruded from the wide-width portions 1120a to form the cap portions 20a of the second strands 20. By using, as the molding die 1000, one whose wide-width portions 1120a projecting outward to both sides in the width direction at the lower end portions of the downward projecting space portions 1120 have a relatively narrow up-down direction distance, it is possible to obtain the sheet-shaped molded body 100 whose portions 120a are worked to have a relatively thin thickness.

Then, in a case where emphasis is put on the elongation along the longitudinal direction of the second strands 20, the thickness X1 of the cap portions 20a (the portions 120a at the lower end sides of the lower surface-side ribs 120) is preferably less than the thickness X2 of the first strands 10 (base layer 110), and more preferably in a range of ½ to ¼ of the thickness X2 of the first strands 10. Specifically, the thickness X1 is preferably 0.05 to 0.20 mm in order to satisfy both weight reduction and flexibility, and the thickness X2 is preferably 0.40 to 0.70 mm in view of the tear strength in the longitudinal direction.

On the other hand, in a case where emphasis is put on the tear strength in the direction orthogonal to the longitudinal direction of the second strands 20, the thickness X1 of the cap portions 20a (the portions 120a at the lower end sides of the lower surface-side ribs 120) is preferably equal to or more than the thickness X2 of the first strands 10. However, too large a value of the thickness X1 of the cap portions 20a leads to an increase in the total thickness and weight of the touch fastener 1 and may make the touch fastener 1 difficult to handle, and therefore, the thickness X1 is more preferably in a range of one to four times, still more preferably 1.5 to 2.5 times the thickness X2 of the first strands 10. Specifically, the thickness X1 is preferably 0.20 to 0.50 mm in view of the tear strength in the direction orthogonal to the longitudinal direction, and the thickness X2 is preferably 0.10 to 0.40 mm in order to satisfy both weight reduction and flexibility.

The second strands 20 each have the stem 20b in addition to the cap portion 20a. Therefore, in the above-described adjustment of the thickness X1 of the cap portions 20a, dimensional parameters of the entire second strands 20 including the stems 20b are also preferably taken into consideration. Both in the case where emphasis is put on the elongation characteristic along the longitudinal direction of the second strands 20 and in the case where emphasis is put on the tear characteristic in the direction substantially orthogonal to the longitudinal direction of the second strands 20, the stems 20b also preferably have certain cross-sectional area and width relative to the cross-sectional area of the cap portions 20a. Therefore, preferably, the cross-sectional area Y1 of each of the cap portions 20a taken along the direction orthogonal to the longitudinal direction being the orientation direction of the second strand 20 is in a range of 50 to 80% of the cross-sectional area Y2 of the entire second strand 20 including the cap portion 20a and the stem 20b, and the width Z1 of each of the cap portion 20a along the direction orthogonal to the longitudinal direction of the second strand 20 is in a range of two to six times the width Z2 of the stem 20b (see FIG. 5(a)). The cross-sectional area Y1 of the cap portion 20a is more preferably in a range of 50 to 70% of the cross-sectional area Y2, and the width Z1 of the cap portion 20a is more preferably three to four times the width Z2 of the stem 20b.

In this embodiment, the upper surface-side ribs 130 and the lower surface-side ribs 120 are formed at positions where they face each other across the base layer 110 (see FIGS. 3(b), (c)). Accordingly, the engagement elements 30 are provided on intersections of the first strands 10 and the second strands 20 as illustrated in FIGS. 1(a), (b), hut the positions of the engagement elements 30 are not limited to these. That is, it is also possible to form the upper surface-side ribs 130 not at positions where they face the lower surface-side ribs 120 but at positions deviated therefrom, and as a result, provide the engagement elements 30 at positions deviated from the intersections of the first strands 10 and the second strands 20.

Since the touch fastener 1 of this embodiment is manufactured in the above-described manner, the first strands 10, the second strands 20, and the engagement elements 30 are integrally molded, and by using a thermoplastic elastomer as their material, the first strands 10, the second strands 20, and the engagement elements 30 all have certain elasticity. As the thermoplastic elastomer, the material can be appropriately selected in consideration of the use and so on, and usable is styrene-based one, ester-based one, a nylon-based resin such as nylon 6 and nylon 66, a polyester-based resin such as polyethylene terephthalate, polybutylene terephthalate, and polylactic acid, an ethylene-vinyl alcohol copolymer, or the like. However, a thermoplastic polyester elastomer is preferably used in view of durability, heat resistance, moldability, and so on.

Being formed of the thermoplastic elastomer, the touch fastener 1 of this embodiment has certain elasticity. Therefore, the touch fastener 1 has high followability to the relative movement of portions which are to be engaged using the touch fastener 1 attached thereto, and can cope with force in the shear direction owing to the elongation/contraction or deformation of the first strands 10, the second strands 20, and the engagement elements 30, thereby capable of preventing the disengagement of the engagement elements 30. Therefore, by providing the touch fastener 1 of this embodiment by integral molding on a member in a moving body such as an automobile, for example, a cushioning member (including a urethane pad, and so on) of a seat, to fix the cushioning member to an outer layer member, a frame, or the like, it is possible to prevent the disengagement owing to the aforesaid elongation/contraction or deformation even when a large impact load is inputted as a result of a collision or the like, to cope with the impact load. When the touch fastener 1 is used to join tongue pieces on the left and right sides of a foot insertion portion in an instep of a shoe, a large load is sometimes applied by a sudden movement while the wearer plays sports, and even in such a case, the touch fastener 1 of this embodiment can cope with the large load owing to its elastic deformation. Similarly, in a case where the touch fastener 1 is attached to a band-shaped supporter or the like to fix the supporter to an arm or the like, the elastic deformation makes it possible to cope with force in the shear direction caused by the movement of the arm or the like. In particular, this embodiment includes the hole portions 40 each surrounded by the adjacent first strands 10, 10 and the adjacent second strands 20, 20, and therefore, when the aforesaid force acts, not only owing to the elastic deformation of the first strands 10, the second strands 20, or the engagement elements 30 themselves but also owing to the accompanying deformation of the hole portions 40, this embodiment can exhibit higher followability to the relative movement of the portions to be engaged than a structure without the hole portions 40 even if both are made of the same material. The shape of the hole portions 40 is not limited, but preferably, the inclination angle (angle θ in FIG. 2(a)) of the first strands 10 to the virtual line E orthogonal to the second strands 20 is adjusted to a range of 0 to 70 degrees by the adjustment of the angle when the aforesaid cuts are made. If the inclination angle θ is less than 20 degrees, the elongation along the longitudinal direction of the second strands 20 is relatively easy. If the inclination angle θ is 20 degrees or more, especially in a range of 20 to 45 degrees, the shape becomes substantially a parallelogram or closer to a rhombus and the elongation in the width direction is relatively easy, making it easy to maintain the engagement with the mating member even if a sudden load in the width direction is applied. Thus, the direction in which the touch fastener 1 easily elongates can be adjusted by the inclination angle θ.

Examples 1, 2

As Examples 1, 2, two kinds of mesh-type touch fasteners 1 (Example 1 (sample No. S-3670) and Example 2 (sample No. S-3680)) were manufactured using a PBT elastomer (manufactured by DuPont Toray Co., Ltd., product name "Hytrel" (registered trademark), product number 6377) as a thermoplastic polyester elastomer.

Table 1 shows the dimensions of portions, that is, first strands 10, second strands 20, and engagement elements 30 of Examples 1 and 2. In Table 1, "Strand 1" represents the first strands 10, "Strand 2" represents the second strands 20, and "Hook" represents the engagement elements 30. Further, in Table 1, the height of the engagement elements (Hook) 30, Stem cross-sectional area (the area of a horizontal cross-section of stems 30b of the engagement elements 30 at a point where the stem width is narrowest in the height direction), the cross-sectional area of Strand 1 (first strands 10) taken along a direction orthogonal to a longitudinal direction (the area of a cross-section in the direction orthogonal to the longitudinal direction of the second strands 20), and the cross-sectional area of Strand 2 (second strands 20) taken along the direction orthogonal to the longitudinal direction (the area of a cross-section in the width direction orthogonal to the longitudinal direction of the second strands 20) were measured at the places indicated in FIG. 5.

Further, the thickness X2 of the first strands 10 of Example 1 (sample No. S-3670)=0.25 mm, and in the second strands 20, the thickness X1 of cap portions 20a=0.17 mm, the height X3 of stems 20b (the distance from the boundary position D between the first strands 10 and the second strands 20 to the tops of the outer end surfaces of the cap portions 20a minus the thickness X1 of the cap portions 20a)=0.35 mm, the cross-sectional area Y1 of the cap portions 20a=0.10 mm$^2$, the cross-sectional area Y2 of the entire second strands 20=0.20 m$^2$, the width Z1 of the cap portions 20a=0.59 mm, and the width Z2 of the stems 20b=0.18 mm. Ratios of these dimensional parameters were as follows: X2:X1=1.0:0.7, X1:X3=1.0:2.1, Y2:Y1=1.0:0.7, and Z1:Z2=1.0:0.3. Further, the inclination angle θ of the first strands 10 was 4.48 degrees as shown in Table 1.

The thickness X2 of the first strands 10 of Example 2 (sample No. S-3680)=0.47 mm, and in the second strands 20, the thickness X1 of cap portions 20a=0.15 mm, the height X3 of stems 20b=0.31 mm, the cross-sectional area Y1 of the cap portions 20a=0.07 mm$^2$, the cross-sectional area Y2 of the entire second strands 20=0.18 mm$^2$, the width Z1 of the cap portions 20a=0.61 mm, and the width Z2 of the stems 20b=0.19 mm. Ratios of these dimensional parameters were as follows: X2:X1=1.0:0.3, X1:X3=1.0:2.1, Y2:Y1=1.0:0.64, and Z1:Z2=1.0:0.3. Further, the inclination angle θ of the first strands 10 was 4.13 degrees as shown in Table 1.

As is apparent from the above, the dimensional parameters and the inclination angle θ of Examples 1 and 2 all fall within the ranges of the aforesaid type which puts emphasis on the elongation characteristic along the longitudinal direction of the second strands 20.

(Engagement Force Test)

An engagement force test was conducted on the touch fasteners of Examples 1, 2, and for comparison, the same test was conducted also on a mesh-type touch fastener manufactured using nylon (PA12) (Comparative Example 1 (sample No. S2771)), a mesh-type touch fastener manufactured using polypropylene (PP) (Comparative Example 2 (sample No. S1576)), and a touch fastener using the same PBT elastomer as that of Examples 1, 2 but having a film structure that is not of a mesh type and having many discrete engagement elements formed on both surfaces of a base layer (Comparative Example 3 (sample No. S-3468-1)).

a) Peel Strength (Peel Strength), Shear Strength (Tensile Shear Strength)

Test pieces each had a 170 mm length (length along the extrusion direction, that is, length along the longitudinal direction of the second strands 20 in the case of the touch fastener 1 of this embodiment) and a 20 mm width. Peel strength was measured using a tensile testing machine (manufactured by SHIMADZU Corporation) in conformity with JIS L3416. Shear strength was measured in conformity with JIS L3416 while the touch fastener 1 and a mating member (loop member) were pulled in the shear direction at a tensile speed of 100 mm/min by a tensile testing machine manufactured by SHIMADZU Corporation). Incidentally, the measurement of the shear strength was conducted while a 50 mm range in the length direction of the touch fastener 1 from its edge was engaged with the mating member (loop member). "ZK4030" which is the mating member (loop member) is a pile fabric manufactured by TOYO SENKO Co., Ltd, and "E40000" is a tricot manufactured by Kuraray Fastening Co., Ltd. The former has a relatively lower density of loop-forming fibers and has a softer base fabric than the latter. Table 1 and Table 2 show the results.

TABLE 1

| Item | | Sample tested | | | |
|---|---|---|---|---|---|
| Hook member (touch fastener) | Material | Polyester (PBT elastomer) | | | |
| | Base form | Mesh Structure | | | |
| | Product No., sample No. | S-3670 (Example 1) | | S-3680 (Example 2) | |
| | Brand of resin used | Hytrel 6377 | | Hytrel 6377 | |
| Strand 1 (first strand) | Cross-sectional area mm2 | 0.13 | | 0.25 | |
| | Density piece/cm | 10.14 | | 10.34 | |
| Strand 2 (second strand) | Cross-sectional area mm2 | 0.14 | | 0.11 | |
| | Density piece/cm | 5.71 | | 5.62 | |
| Hook (engagement element) | Height mm | 0.62 | | 0.63 | |
| | Stem cross-sectional area mm2 | 0.12 | | 0.13 | |
| | Density piece/cm2 | 57.95 | | 58.06 | |
| Others | Cut angle (θ) | 4.48 | | 4.13 | |
| | Stretch ratio times | 1.55 | | 1.55 | |
| Performance | Mating member (loop) | ZK4030 low density/ soft base fabric | E40000 high density/ hard base fabric | ZK4030 low density/ soft base fabric | E40000 high density/ hard base fabric |
| | Peel strength N/cm | 2.60 | 1.57 | 2.68 | 1.55 |
| | Shear strength (obtain F-S curve) N/cm2 | 6.2 | 6.2 | 5.8 | 5.8 |

TABLE 2

| Item | | | Sample for comparison | | | | | |
|---|---|---|---|---|---|---|---|---|
| Hook member (touch fastener) | Material | | (Comparative Example 1) nybn (PA12) | | (Comparative Example 2) olefin (PP) | | (Comparative Example 3) polyester resin (PBT elastomer) | |
| | Base form | | Mesh structure | | | | Film structure | |
| | Product No., sample No. | | S-2771 | | S-1576 | | S-3468-1 | |
| | Brand of resin used | | UBESTA 3030JFX1 | | EA7AD | | Hytrel 6377 | |
| Strand 1 (first strand) | Cross-sectional area | mm2 | 0.13 | | 0.21 | | — | |
| | Density | piece/cm | 10.57 | | 0.81 | | — | |
| Strand 2 (second strand) | Cross-sectional area | mm2 | 0.14 | | 0.13 | | — | |
| | Density | piece/cm | 5.35 | | 7.16 | | — | |
| Hook (engagement element) | Height | mm | 0.62 | | 0.61 | | 0.32 | |
| | Stem cross-sectional area | mm2 | 0.14 | | 0.16 | | 0.13 | |
| | Density | piece/cm2 | 62.85 | | 62.86 | | 81.57 | |
| Others | Cut angle (θ) | ° | 4.45 | | 4.43 | | 29.07 | |
| | Stretch ratio | times | 1.55 | | 1.63 | | 2.41 | |
| Performance | Mating member (loop) | | ZK4030 low density/ soft base fabric | E40000 high density/ hard base fabric | ZK4030 low density/ soft base fabric | E40000 high density/ hard base fabric | ZK4030 low density/ soft base fabric | E4C00C high density/ hard base fabric |
| | Feel strength | N/cm | 2.87 | 1.37 | 239 | 1.56 | 1.09 | 0.25 |
| | Shear strength (obtain F-S curve) | N/cm2 | 6.7 | 6.7 | 4.6 | 4.8 | 7.1 | 16.3 |

In Table 1 and Table 2, an average value in five test pieces is shown for each dimensional item, and an average value in three tests is shown for each performance item.

From Table 1 and Table 2, the peel strength and the shear strength of Examples 1 and 2 were both on similar levels as those of Comparative Example 1. As compared with Comparative Example 2, the peel strength was on a similar level, but the shear strength was higher in Examples 1 and 2 by 1.0 N/cm$^2$ more. This is thought to be because Comparative Example 2 has little elasticity. As compared with Comparative Example 3 made of the same material as that of Examples 1, 2, the peel strength was higher in Examples 1 and 2. As for the shear strength, there was no big difference in the case where the mating member was ZK4030, but there was a big difference in the case where the mating member was E40000. This is thought to be because a difference in elasticity associated with the presence or absence of mesh has an influence, but the characteristics of the mating member also have an influence, which will be discussed later.

b) Characteristics of F-S Curves

FIG. 6 to FIG. 10 each illustrate the relationship between a load (test force) and a displacement amount measured at the time of the pulling in the aforesaid shear strength test.

Figure 6:
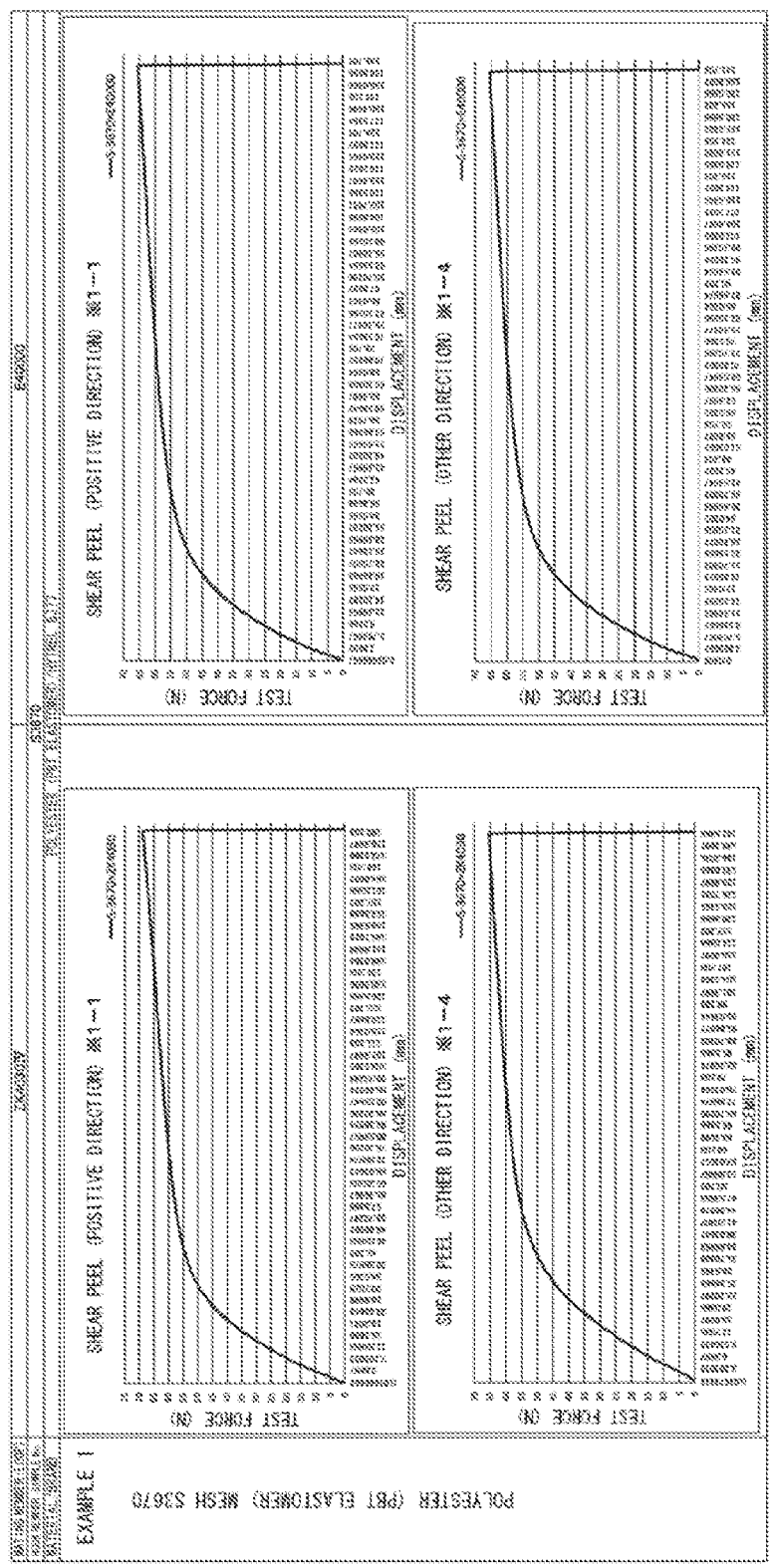
FIG. 6 illustrates graphs regarding four test pieces, the graphs each representing the relationship between a load (test force) and a displacement amount in a tensile shear test conducted while a touch fastener of Example 1 is engaged with a mating member.

The touch fastener 1 of Example 1 elongated without separating from the mating member until the displacement amount reached about 140 mm to about 180 mm, and during this period, the load value in the shear direction due to their engagement reached about 65 N to about 70 N, and then the load value in the shear direction sharply dropped by several ten N or more at a stroke to reach near 0 N because the touch fastener 1 broke (see FIG. 6).

Figure 7:
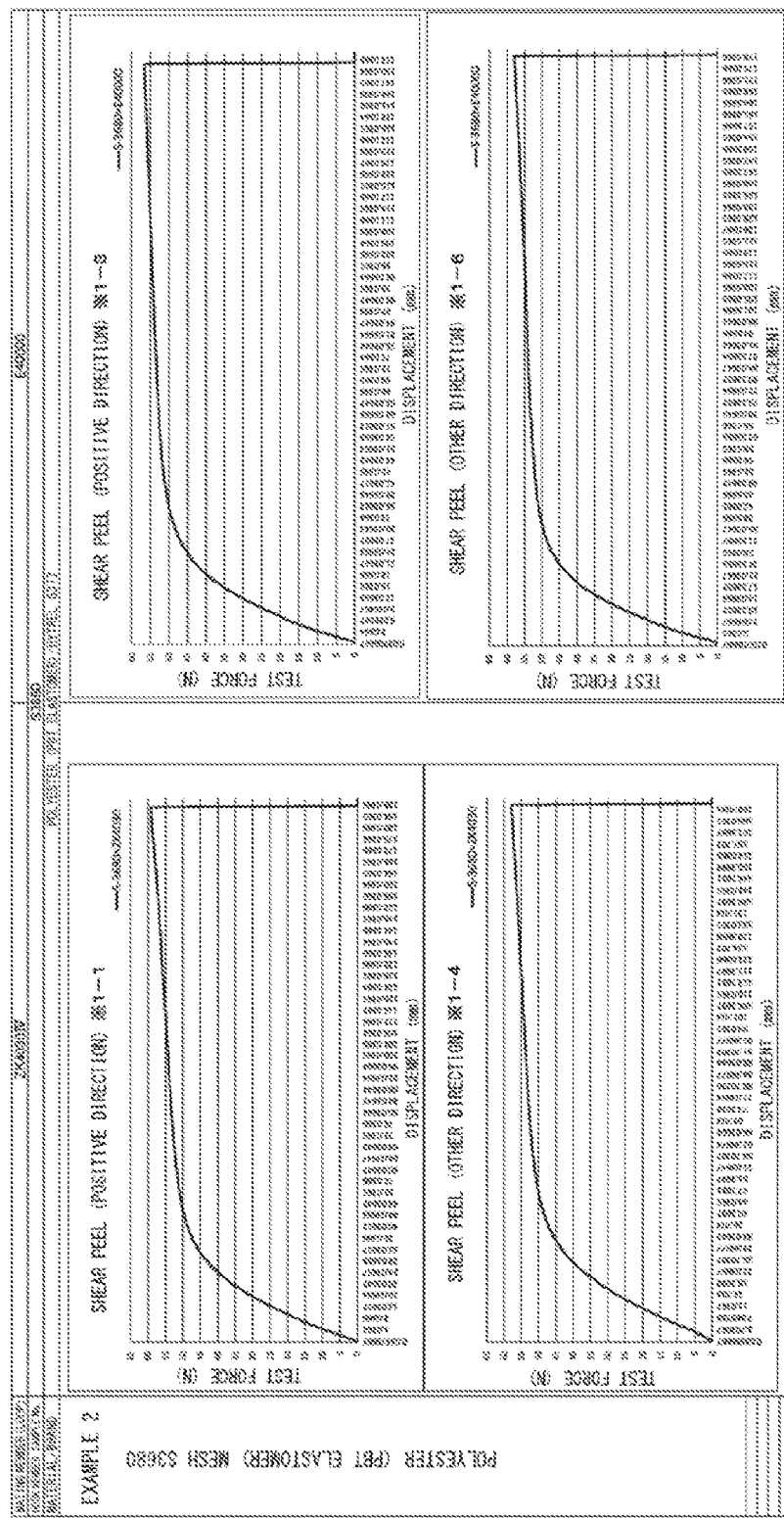
FIG. 7 illustrates graphs regarding four test pieces, the graphs each representing the relationship between a load (test force) and a displacement amount in a tensile shear test conducted while a touch fastener of Example 2 is engaged with a mating member.

The touch fastener 1 of Example 2 elongated without separating from the mating member until the displacement amount reached about 150 mm to about 190 mm, and during this period, the load value in the shear direction due to their engagement reached about 55 N to about 60 N, and then the load value in the shear direction dropped sharply by several ten N or more at a stroke to reach near 0 N because the touch fastener 1 broke (see FIG. 7).

Figure 8:
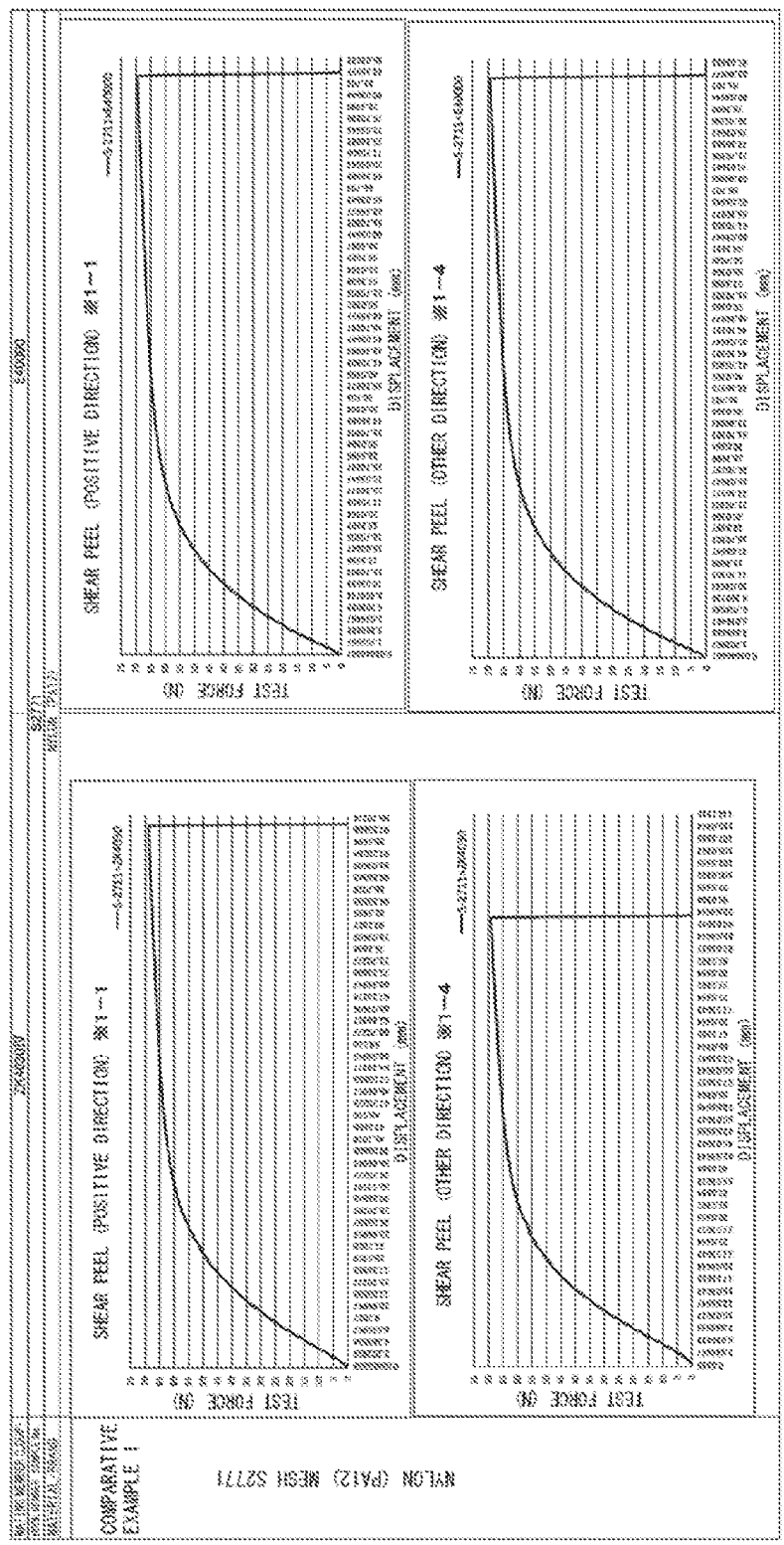
FIG. 8 illustrates graphs regarding four test pieces, the graphs each representing the relationship between a load (test force) and a displacement amount in a tensile shear test conducted while a touch fastener of Comparative Example 1 is engaged with a mating member.

In the touch fastener of Comparative Example 1, the load value in the shear direction due to its engagement with the mating member reached about 65 N to about 70 N by the time the load value dropped sharply by several ten N or more to reach near 0 N, but a displacement amount by which it elongated without separating from the mating member was in a range of about 80 mm to about 100 mm (see FIG. 8).

Figure 9:
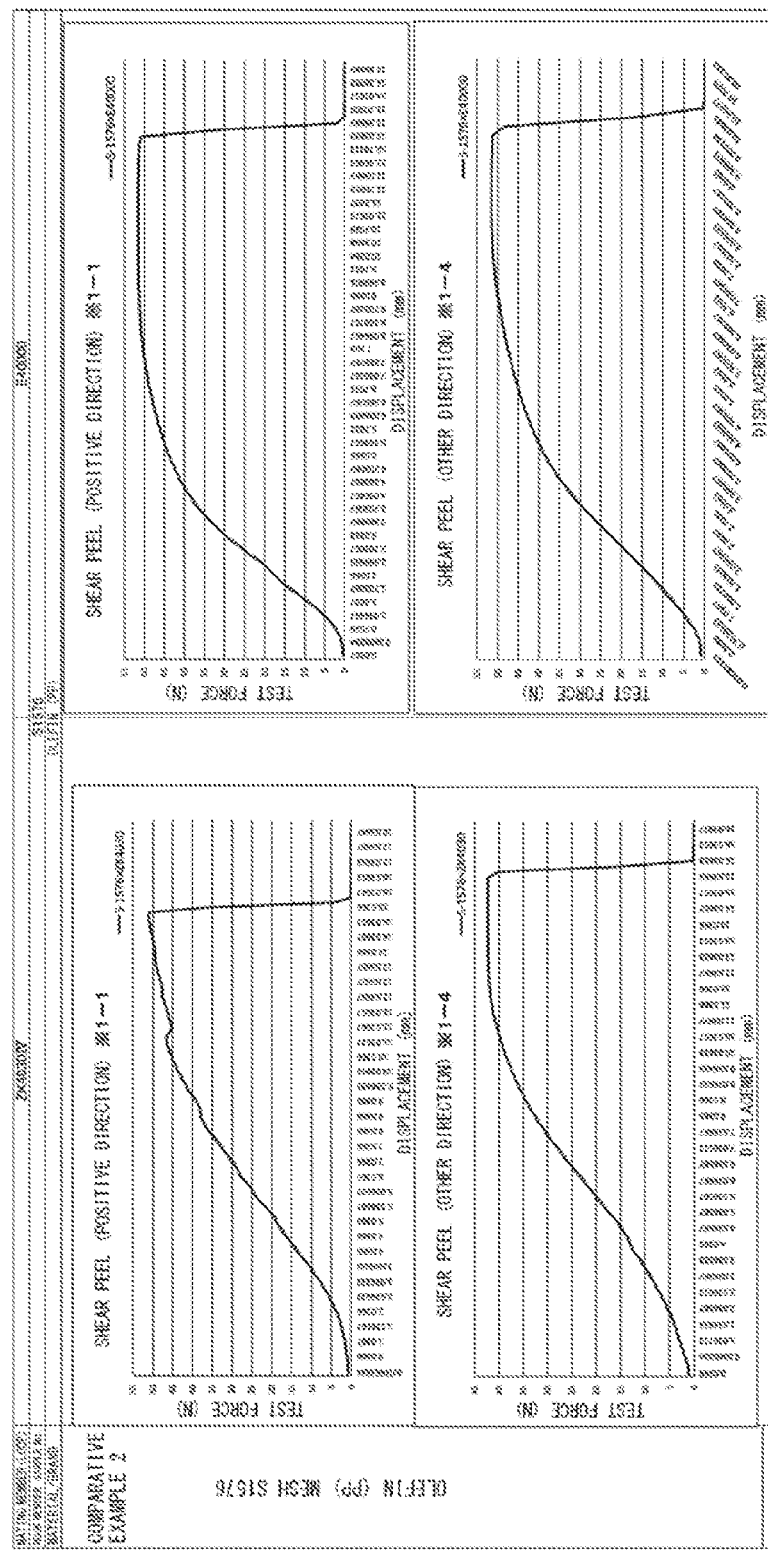
FIG. 9 illustrates graphs regarding four test pieces, the graphs each representing the relationship between a load (test force) and a displacement amount in a tensile shear test conducted while a touch fastener of Comparative Example 2 is engaged with a mating member.

In the touch fastener of Comparative Example 2, the load value in the shear direction due to its engagement with the mating member reached about 40 N to about 50 N by the time the load value dropped sharply by several ten N or more to reach near 0 N, but a displacement amount by which it elongated without separating from the mating member was in a range of about 10 mm to about 16 mm (see FIG. 9).

In the touch fastener of Comparative Example 3, in the case where the mating member (loop) was ZK4030, after the load value reached about 70 N at a displacement amount of about 15 mm, they started separating from each other, the loops of the mating member snapped, and the load value dropped sharply, and thereafter, hooking to other loops and snapping were repeated and after sharply rising, the load value sharply dropped again. Similarly, in the case where the mating member was E40000, after rising to about 170 N at a displacement amount of about 23 mm, the load value sharply dropped at a stroke to near 10 N and the load value remained low while they separated from each other and the loops of the mating member were snapped (see FIG. 10).

From the above, it can be seen that the touch fasteners 1 of Example 1 and Example 2 elongate by 140 mm or more without separating from the mating member. In contrast, in Comparative Example 1, which elongated most among Comparative Examples 1 to 3, elongates by about 100 mm, and it is seen that the elongation of Example 1 and Example 2 is large. Accordingly, the touch fasteners 1 of Example 1 and Example 2 have a large displacement amount especially along the longitudinal direction of the second strands 20 and have high followability to the relative movement of the portions to be engaged. Moreover, because of the large displacement amount, they can exhibit high impact absorbing power between the portions to be engaged and thus are suitable for engaging portions to which an impact load is applied From these, it follows that, when the displacement amount is measured in the tensile shear test in which the test piece whose length along the longitudinal direction is 170 mm and whose width orthogonal to the longitudinal direction of the second strands is 20 mm is pulled in the shear direction while the engagement elements in a 50 mm range from its one edge in terms of the longitudinal direction of the second strands are engaged with the mating member (loop member), one in which the displacement amount along the longitudinal direction of the second strands up to the instant when the load value in the shear direction due to the engagement of the touch fastener and the mating member (loop member) sharply drops is 120 mm or more is preferable, and one in which this displacement amount is 140 mm or more is more preferable. In other words, the displacement amount in the aforesaid test is preferably about 70% or more, and more preferably about 80% or more of the total length that the touch fastener has before being pulled.

c) Elastic Deformation Ratio

Figure 11:
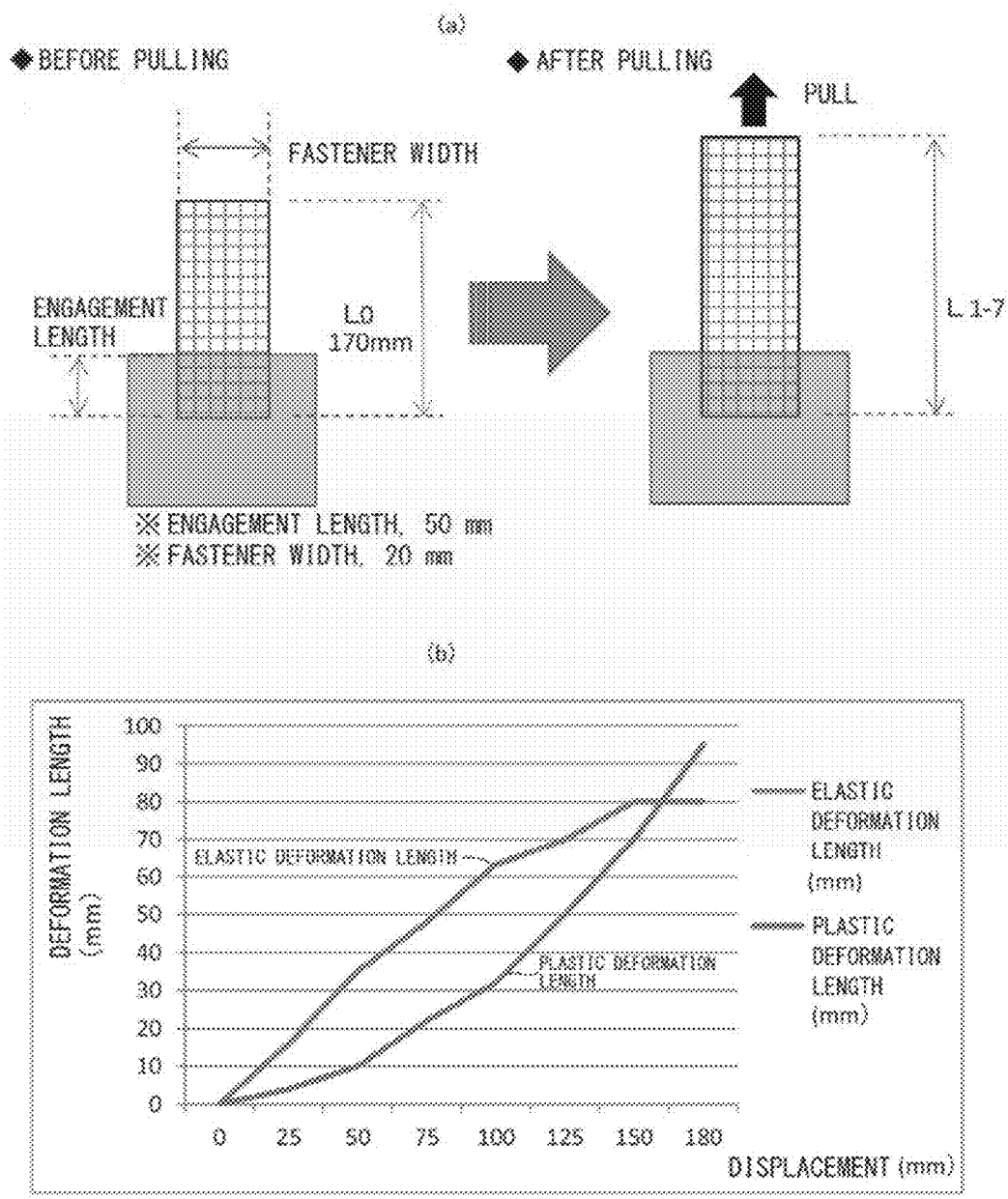
FIG. 11(a) is a view illustrating a measurement range from dimension L0 to L7 in the tensile shear test conducted while the touch fastener of Example 2 is engaged with the mating member.
FIG. 11(b) is a graph in which an elastic deformation length and a plastic deformation length of the touch fastener of Example 2 are compared.

Regarding the touch fastener 1 of Example 2 (sample No. S-3680), Table 3 shows dimension under tension, length when it is restored by tension cancellation (dimension under no tension), an amount of change in the dimension under tension (change in dimension under tension), elastic deformation length which is a difference between the dimension under tension and the dimension under no tension, a ratio of the elastic deformation length in the amount of change in the dimension under tension, plastic deformation length which is a difference between the amount of change in the dimension under tension and the elastic deformation length, and a ratio of the plastic deformation length in the amount of change in the dimension under tension, in the aforesaid shear strength test. As illustrated in FIG. 11(a), L0 represents the length before the pulling, and L1 to L7 each represent the length after the pulling. Further, FIG. 11(b) is a graph in which the elastic deformation length and the plastic deformation length are compared.

TABLE 3

<Fastener length at each displacement in loop engagement state>

| Fastener | Tensile speed (mm/min) | Displacement (mm) | Dimension under tension (mm) | Dimension under no tension (mm) | Change in dimension under tension (mm) | Elastic deformation length (mm) | Ratio (%) | Plastic deformation length (mm) | Ratio (%) | Note |
|---|---|---|---|---|---|---|---|---|---|---|
| S-3680 (Example 2) | 100 | 0 | 170 | 170 | 0 | 0 | — | 0 | — | L0 |
| | | 25 | 190 | 174 | 20 | 16 | 80% | 4 | 20% | L1 |
| | | 50 | 215 | 180 | 45 | 35 | 78% | 10 | 22% | L2 |
| | | 75 | 240 | 192 | 70 | 48 | 69% | 22 | 31% | L3 |
| | | 100 | 205 | 202 | 95 | 63 | 66% | 32 | 34% | L4 |
| | | 125 | 290 | 220 | 120 | 70 | 58% | 50 | 42% | 15 |
| | | 150 | 320 | 240 | 150 | 80 | 53% | 70 | 47% | L6 |
| | | 180 | 345 | 265 | 175 | 80 | 46% | 95 | 54% | L7 (breaking) |

From Table 3 and the graph in FIG. 11(b), it can be seen that the ratio of the elastic deformation length of the touch fastener 1 of Example 2 is about 50% or more up to an instant just before the touch fastener 1 breaks. It can also be seen from this that the touch fastener 1 of Example 2 has high elasticity and high followability to the relative movement of the portions to be engaged. Further, the ratio of the plastic deformation length gradually increases while the elongation is 120 mm or more, preferably 140 mm or more, indicating that high damping force can be exhibited even if a sudden relative movement of the portions to be engaged is caused by an impact load.

d) Characteristics of F-S Curves of the Test Pieces By Themselves

Figure 12:
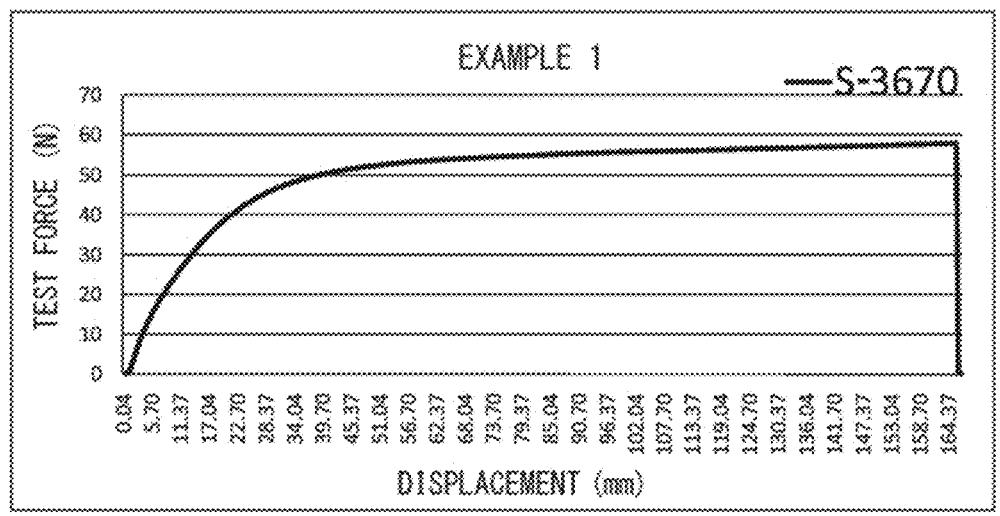
FIGS. 12(a), (b) are graphs representing the results of measuring the tensile strength of test pieces by themselves of the touch fasteners of Example 1 and Example 2.
Figure 12:
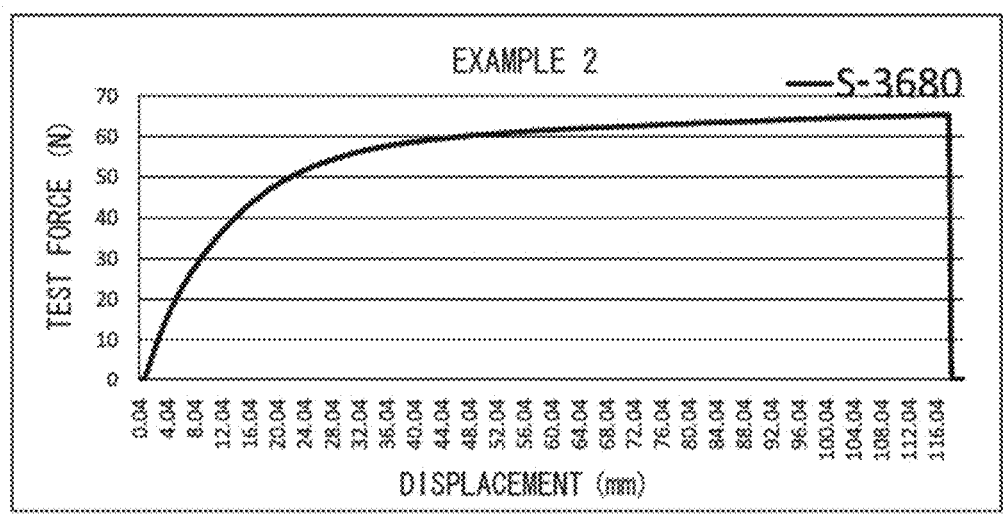
Figure 13:
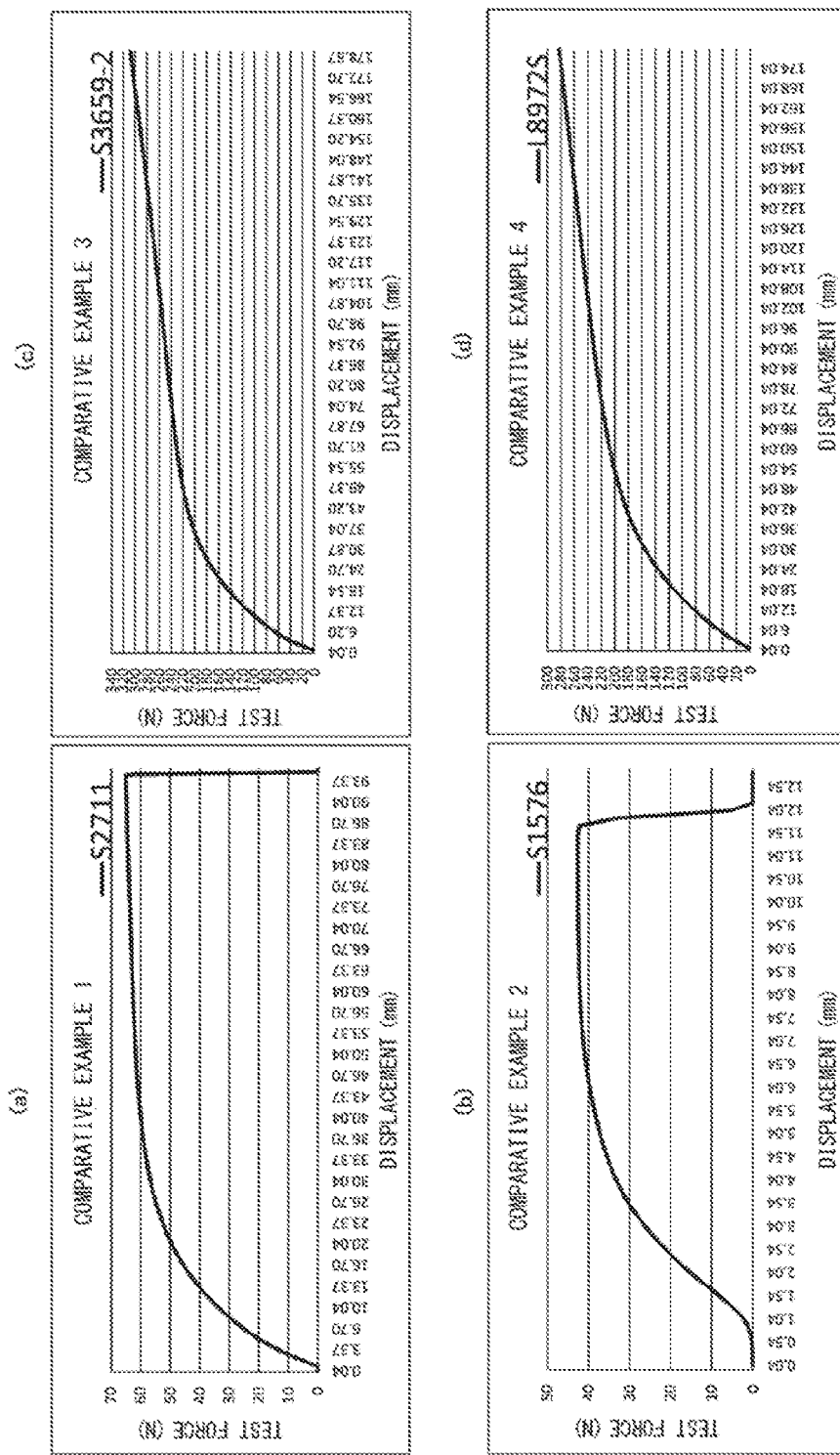
FIGS. 13(a) to (d) are graphs representing the results of measuring the tensile strength of test pieces by themselves of the touch fasteners of Comparative Examples 1 to 4.

Next, the same test pieces as above were subjected to a tensile test (Kuraray Fastening method) in which the test pieces by themselves were pulled along the longitudinal direction of the second strands (extrusion direction) at a tensile speed of 100 mm/min by a tensile testing machine (manufactured by SHIMADZU Corporation). Example 1 (sample No. S-3670), Example 2 (sample No. S-3680), Comparative Example 1 (sample No. S2711), Comparative Example 2 (sample No. S1576), and Comparative Example 3 (sample No. S-3659-2) are the same as above. Comparative Example 4 (sample No. L8972S) is film-shaped and made of a thermoplastic polyester elastomer as in Comparative Example 3 but is softer than Comparative Example 3. Table 4 and Table 5 show dimensional changes of these test pieces, and FIG. 12 and FIG. 13 are graphs each representing the relationship between a displacement amount and a load.

TABLE 4

<Fastener length at each displacement of fastener by itself>

| Fastener | | | Tensile speed (mm/min) | Displacement (mm) | Dimension under tension (mm) | Dimension under no tension (mm) | Change in dimension under tension (mm) | Elastic deformation length (mm) | Ratio (%) | Plastic deformation length (mm) | Ratio (%) | Note |
|---|---|---|---|---|---|---|---|---|---|---|---|---|
| Brand | Material | Structure | | | | | | | | | | |
| S-3670 Example 1 | Polyester | Mesh | 100 | 0 | 170 | 170 | 0 | 0 | — | 0 | — | L0 |
| | | | | 25 | 198 | 172 | 28 | 26 | 93% | 2 | 7% | L1 |
| | | | | 50 | 223 | 178 | 53 | 45 | 85% | 8 | 15% | L2 |
| | | | | 75 | 248 | 186 | 78 | 62 | 79% | 16 | 21% | L3 |
| | | | | 100 | 272 | 200 | 102 | 72 | 71% | 30 | 29% | L4 |
| | | | | 125 | 298 | 213 | 128 | 85 | 66% | 43 | 34% | L5 |
| | | | | 150 | 323 | 228 | 153 | 95 | 62% | 58 | 38% | L6 |
| | | | | 180 | — | — | — | — | — | — | — | L7 (breaking) |
| S-3680 Example 2 | Polyester | Mesh | 100 | 0 | 170 | 170 | 0 | 0 | — | 0 | — | L0 |
| | | | | 25 | 196 | 171 | 26 | 25 | 96% | 1 | 4% | L1 |
| | | | | 50 | 223 | 178 | 53 | 45 | 85% | 8 | 15% | L2 |
| | | | | 75 | 247 | 187 | 77 | 60 | 78% | 17 | 22% | L3 |
| | | | | 100 | 270 | 201 | 100 | 69 | 69% | 31 | 31% | L4 |
| | | | | 125 | 297 | 212 | 127 | 85 | 67% | 42 | 33% | 1.5 |
| | | | | 150 | 322 | 230 | 152 | 92 | 61% | 60 | 39% | L6 |
| | | | | 180 | — | — | — | — | — | — | — | L7 (breaking) |

TABLE 5

<Fastener length at each displacement of fastener by itself>

| Fastener | | | Tensile speed | Displacement | Dimension under tension | Dimension under no tension | Change in dimension under tension | Elastic deformation length | Ratio | Plastic deformation length | Ratio | Note |
|---|---|---|---|---|---|---|---|---|---|---|---|---|
| Brand | Material | Structure | (mm/min) | (mm) | (mm) | (mm) | (mm) | (mm) | (%) | (mm) | (%) | |
| S-2711 Comparative Example 1 | NY12 | Mesh | 100 | 0 | 170 | 170 | 0 | 0 | — | 0 | — | L0 |
| | | | | 25 | 198 | 173 | 28 | 25 | 89% | 3 | 11% | L1 |
| | | | | 50 | 222 | 184 | 52 | 38 | 73% | 14 | 27% | L2 |
| | | | | 75 | 247 | 201 | 77 | 46 | 60% | 31 | 40% | L3 |
| | | | | 100 | — | — | — | — | — | — | — | L4 (breaking) |
| | | | | 125 | — | — | — | — | — | — | — | L5 |
| | | | | 150 | — | — | — | — | — | — | — | L6 |
| | | | | 180 | — | — | — | — | — | — | — | L7 |
| S-1576 Comparative Example 2 | Olefin (PP) | Mesh | 100 | 0 | 170 | 170 | 0 | 0 | — | 0 | — | L0 |
| | | | | 25 | — | — | — | — | — | — | — | L1 (breaking) |
| | | | | 50 | — | — | — | — | — | — | — | L2 |
| | | | | 75 | — | — | — | — | — | — | — | L3 |
| | | | | 100 | — | — | — | — | — | — | — | L4 |
| | | | | 125 | — | — | — | — | — | — | — | L5 |
| | | | | 150 | — | — | — | — | — | — | — | L6 |
| | | | | 180 | — | — | — | — | — | — | — | L7 |
| S-3659-2 Comparative Example 3 | Polyester | Film | 100 | 0 | 170 | 170 | 0 | 0 | — | 0 | — | L0 |
| | | | | 25 | 195 | 171 | 25 | 24 | 96% | 1 | 4% | L1 |
| | | | | 50 | 220 | 173 | 50 | 42 | 84% | 8 | 16% | L2 |
| | | | | 75 | 245 | 187 | 75 | 58 | 77% | 17 | 23% | L3 |
| | | | | 100 | 268 | 199 | 98 | 69 | 70% | 29 | 30% | L4 |
| | | | | 125 | 293 | 213 | 123 | 80 | 65% | 43 | 35% | L5 |
| | | | | 150 | 319 | 230 | 149 | 89 | 60% | 60 | 40% | L6 |
| | | | | 180 | 349 | 250 | 179 | 99 | 55% | 80 | 45% | L7 |
| L8972S Comparative Example 4 | Polyester (soft type) | Film | 100 | 0 | 170 | 170 | 0 | 0 | — | 0 | — | L0 |
| | | | | 25 | 198 | 171 | 28 | 27 | 96% | 1 | 4% | L1 |
| | | | | 50 | 222 | 174 | 52 | 48 | 92% | 4 | 8% | L2 |
| | | | | 75 | 248 | 180 | 78 | 68 | 87% | 10 | 13% | L3 |
| | | | | 100 | 272 | 188 | 102 | 84 | 82% | 18 | 18% | L4 |
| | | | | 125 | 297 | 196 | 127 | 101 | 80% | 26 | 20% | L5 |
| | | | | 150 | 322 | 205 | 152 | 117 | 77% | 35 | 23% | L6 |
| | | | | 180 | 352 | 218 | 182 | 134 | 74% | 48 | 26% | L7 |

In both the touch fasteners 1 of Example 1 and Example 2, the displacement amount up to the instant of the breakage is 150 mm or more, and the ratio of the elastic deformation length during this period is 60% or more, from which it can be seen that they are highly elastic. In Comparative Example 1, the elastic deformation length up to the instant of the breakage was 60% or more, but it broke before the displacement amount reached 100 mm, and thus has poor followability to the relative movement of the portions to be engaged, and since its plastic deformation length is short, Comparative Example 1 can be said as being lower in impact load damping characteristic than Examples 1 and 2. Comparative Example 2 broke immediately after being pulled, which shows that Comparative Example 2 is very poor in elasticity. In contrast, Comparative Example 3 and Comparative Example 4 did not broke even when the displacement amount was 150 mm, and also they were high in the ratio of the elastic deformation length, and thus exhibited sufficient elasticity. This is because Comparative Example 3 and Comparative Example 4 are made of the same material as that of Example 1 and Example 2, but their load values exceeded about 200 N when the displacement amount was about 50 mm, and when the displacement amount reached 150 mm, the load values reached 280 N or more, which was greatly different from the load value of about 55 N to about 70 N in Example 1 and Example 2 when they broke (at an instant when the load value sharply dropped (this means not an instant after the sharp drop but an instant immediately before the sharp drop)).

As described above, in Example 1 and Example 2, the load at the instant when the load value sharply drops in the test in which the touch fastener is engaged with the mating member (loop member) and pulled in the shear direction is within a range of about 55 N to about 70 N. Therefore, in the case where Comparative Examples 3 and 4 in which the load exceeds about 200 N when the displacement amount is about 50 mm are used, the breakage of the loops of the mating member occurs early in the state in which the touch fastener is engaged with the mating member (loop member). In this case, even if the elasticity of the touch fastener itself is high, the engagement force between the portions to be engaged drops at a stroke, which is not suitable for improving the followability in the state where the portions to be engaged remain engaged. This is why the aforesaid load value (see FIG. 10), which indicates the engagement force with the mating member, measured using the touch fastener of Comparative Example 3 drops sharply before it sufficiently elongates.

Therefore, the mesh structure including the hole portions 40 easily causing the deformation of the strands 10, 20 and the deformation of the engagement elements 30 as in the touch fasteners 1 of Example 1 and Example 2 is preferable. Further, preferable is a characteristic that the breaking-time load in the tensile test conducted on the touch fastener by itself is equal to the load value (in the above example, about 55 N to about 70 N) at the instant when the load value in the shear direction due to the engagement of the touch fastener and the mating member (loop member) sharply drops in the tensile shear test, or even if it is higher than this, is 1.5 times or less. Incidentally, if the breaking-time load is too low, the engagement force decreases, and therefore, a preferable characteristic is that the breaking-time load is 70% or more of the load value at the instant when the load value in the shear direction due to the engagement of the touch fastener and the mating member (loop member) sharply drops.

Examples 3a, 3B, 3C

Example 3A

A mesh-type touch fastener 1 (sample No. S-3694-2) of Example 3A was manufactured using the same PBT elastomer (manufactured by Toray DuPont Co., Ltd., product name "Hytrel" (registered trademark), product number 6377) as that in Examples 1 and 2.

In Example 3A, the thickness X2 of first strands 10=0.19 mm, and in second strands 20, the thickness X1 of cap portions 20$a$=0.33 mm, the height X3 of stems 20$b$=0.40 mm, the cross-sectional area Y1 of the cap portions 20$a$=0.31 mm$^2$, the cross-sectional area Y2 of the entire second strands 20=0.63 mm$^2$, the width Z1 of the cap portions 20$a$=1.01 mm, and the width Z2 of the stems 20$b$=0.27 mm. Ratios of these dimensional parameters were as follows: X2:X1=1.0:1.7, X1:X3=1.0:1.2, Y2:Y1=1.0:0.65, and Z1:Z2=1.0:0.27. Further, the inclination angle θ of the first strands 10 was 3.44 degrees (see FIG. 5 for the positions of the signs).

As is apparent from the above, the dimensional parameters and the inclination angle θ of Example 3A are of the aforesaid type that puts emphasis on the tear strength in the direction substantially orthogonal to the longitudinal direction of the second strands 20.

(Engagement Force Test)

a) Peel Strength (Peel Strength), Shear Strength (Tensile Shear Strength)

Tests of peel strength and shear strength were conducted as in Examples 1 and 2. As a mating member (loop member), "ZK4030" and "E40000" which are the same as those in Examples 1 and 2 were used. The other test conditions are also the same as those in Examples 1 and 2.

As a result, the peel strength was 2.91 N/cm in the case where ZK4030 was the mating member and was 1.44 N/cm in the case where E40000 was the mating member.

The shear strength was 7.03 N/cm$^2$ in the case where ZK4030 was the mating member and was 15.80 N/cm$^2$ in the case where E40000 was the mating member.

b) Characteristics of F-S Curves

Figure 14:
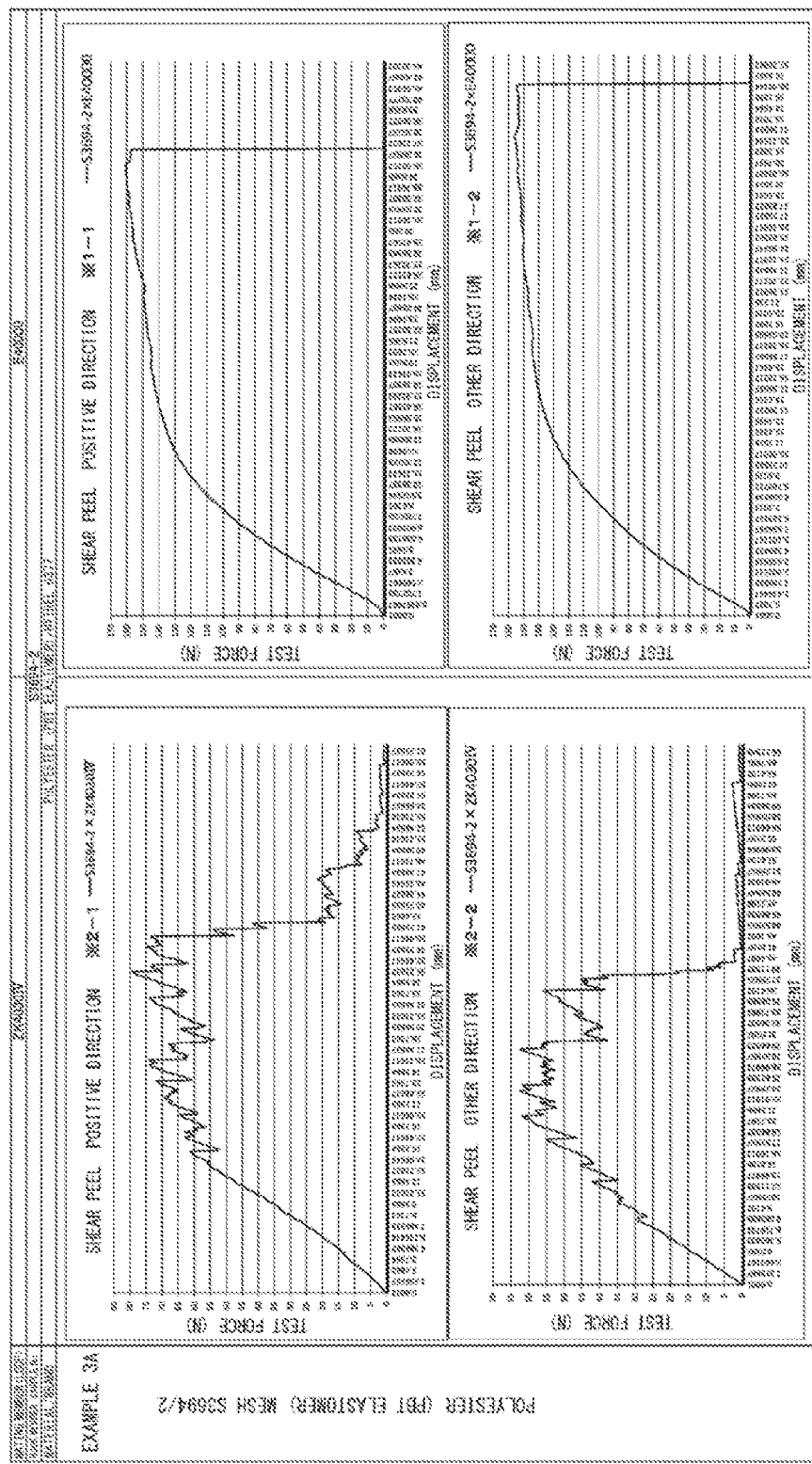
FIG. 14 illustrates graphs regarding four test pieces, the graphs each representing the relationship between a load (test force) and a displacement amount in a tensile shear test conducted while a touch fastener of Example 3A is engaged with a mating member.

FIG. 14 illustrates the relationship between a load (test force) and a displacement amount which were measured at the time of the pulling in the aforesaid test of the shear strength.

In the touch fastener of Example 3, in the case where the mating member (loop) was ZK4030, the load value reached about 55 to 75 N when the displacement amount was about 35 to 40 mm, and then they started separating from each other, the loops of the mating member snapped, and the load value sharply dropped. In the case where the mating member was E40000, the load increased to about 150 to 160 N by the time the displacement amount reached about 35 to 38 mm, and then the load value sharply dropped.

Figure 10:
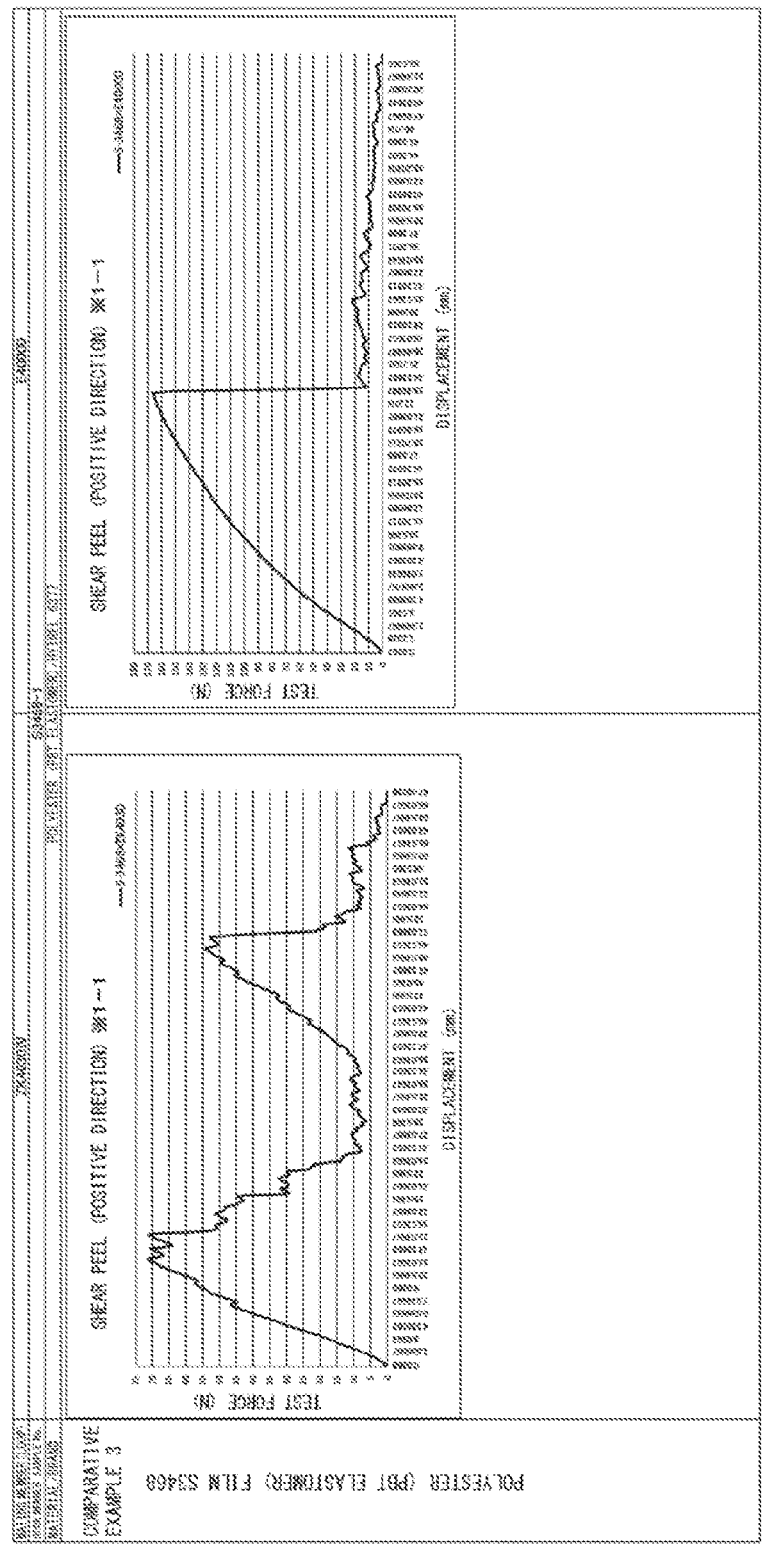
FIG. 10 illustrates graphs regarding two test pieces, the graphs each representing the relationship between a load (test force) and a displacement amount in a tensile shear test conducted while a touch fastener of Comparative Example 3 is engaged with a mating member.

Therefore, the displacement amount along the longitudinal direction of the second strands 20 was smaller in Example 3A than in Example 1 and Example 2. However, as compared with the displacement amount corresponding to the first peak of the load value in Comparative Example 3 in FIG. 10 presenting the similar load value, that in Example 3A was about twice as large, and as compared with the touch fastener without mesh, the displacement amount in the longitudinal direction of the second strands 20 is larger and stretchability improves owing to the mesh.

c) Elastic Deformation Ratio

Figure 15:
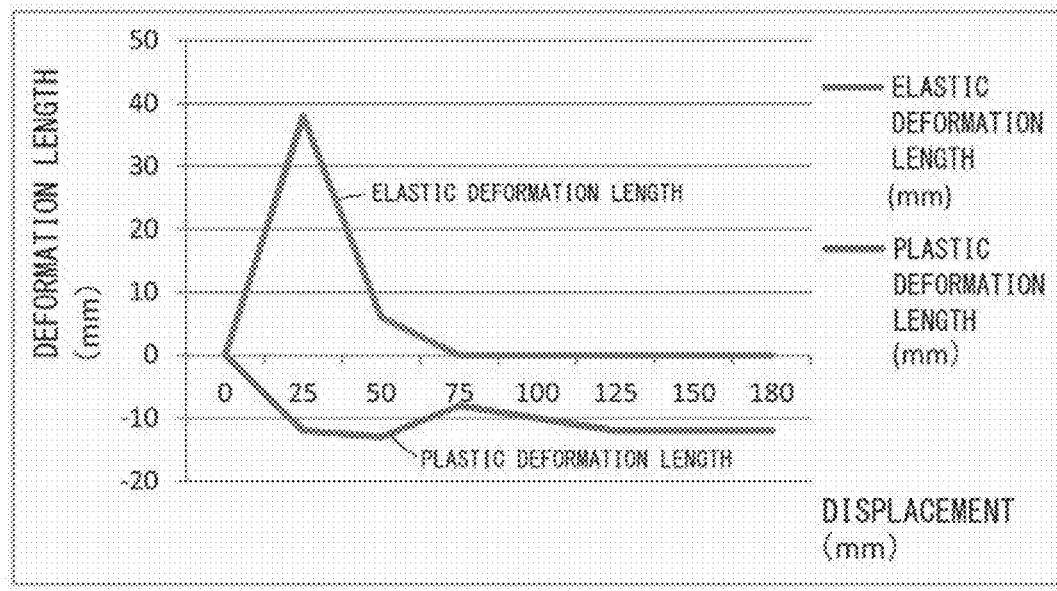
FIG. 15 is a graph in which an elastic deformation length and a plastic deformation length of the touch fastener of Example 3A in the tensile shear test conducted while the touch fastener is engaged with the mating member are compared.

Regarding the touch fastener 1 of Example 3A (sample No. S-3694-2), Table 6 shows dimension under tension, length when it is restored by tension cancellation (dimension under no tension), an amount of change in the dimension under tension (change in dimension under tension), elastic deformation length which is a difference between the dimension under tension and the dimension under no tension, a ratio of the elastic deformation length in the amount of change in the dimension under tension, plastic deformation length which is a difference between the amount of change in the dimension under tension and the elastic deformation length, and a ratio of the plastic deformation length in the amount of change in the dimension under tension, in the shear strength test. FIG. 15 is a graph in which the elastic deformation length and the plastic deformation length are compared.

TABLE 6

<Fastener length at each displacement in loop engagement state>

| Fastener | Tensile speed (mm/min) | Displacement (mm) | Dimension under tension (mm) | Dimension under no tension (mm) | Change in dimension under tension (mm) | Elastic deformation length (mm) | Ratio (%) | Plastic deformation length (mm) | Ratio (%) |
|---|---|---|---|---|---|---|---|---|---|
| S-3694-2 | 100 | 0 | 170 | 170 | 0 | 0 | — | 0 | — |
| Example 3A | | 25 | 196 | 158 | 26 | 38 | 146% | −12 | −46% |
| | | 50 | 163 | 157 | −7 | 6 | −86% | −13 | 186% |
| | | 75 | 162 | 162 | −8 | 0 | 0% | −8 | 100% |
| | | 100 | 160 | 160 | −10 | −10 | 0% | −10 | 100% |
| | | 125 | 158 | 158 | −12 | 0 | 0% | −12 | 100% |
| | | 150 | 158 | 158 | −12 | 0 | 0% | −12 | 100% |
| | | 180 | 158 | 158 | −12 | 0 | 0% | −12 | 100% |

As is seen from Table 6 and the graph in FIG. 15, the ratio of the elastic deformation length of the touch fastener 1 of Example 3A was large until the displacement reached 25 mm, but thereafter, it dropped sharply, and when the displacement reached 50 mm, the partial disengagement from the mating member occurred, and after the displacement reached 75 mm, the complete disengagement from the mating member occurred. Therefore, the elongation along the longitudinal direction of the second strands 20 was smaller than those of Examples 1 and 2.

d) Characteristics of an F-S Curve of the Test Piece By Itself

Figure 16:
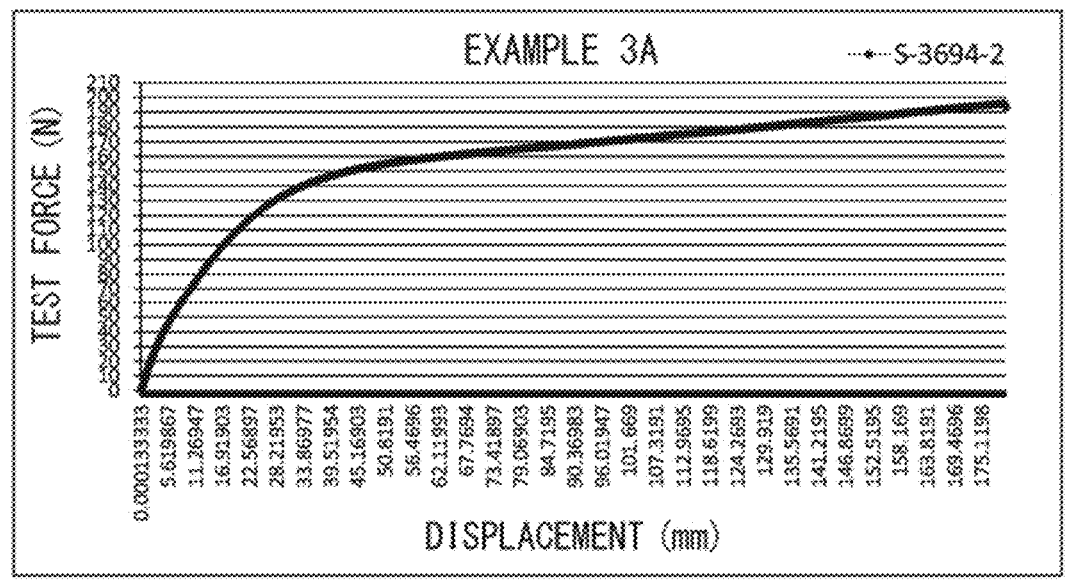
FIG. 16 is a graph representing the result of measuring the tensile strength of a test piece by itself of the touch fastener of Example 3A.

Next, the same test piece as above was subjected to a tensile test (Kuraray Fastening method) in which the test piece by itself was pulled along the longitudinal direction of the second strands (extrusion direction) at a tensile speed of 100 mm/min by a tensile testing machine (manufactured by SHIMADZU Corporation). Table 7 shows dimensional changes of the test piece, and FIG. 16 illustrates a graph representing the relationship between a displacement amount and a load.

3A undergoes plastic deformation when a large load is applied as external force, and is superior in the operation of damping the external force while inhibiting the breakage of the mating member.

Example 3B (Tear Strength)

Next, regarding a touch fastener 1 of Example 3B (sample No. S-3690-1), which was formed of the same material and formed with the same dimensional parameters except the inclination angle θ as those of Example 3A, a tear test in conformity with JIS L-3416 was conducted in the longitudinal direction (lengthwise direction) of second strands 20 and a direction (widthwise direction) orthogonal to the longitudinal direction. The inclination angle θ in Example 3B was 30 degrees. As for the lengthwise direction, a cut with a predetermined length was made along the longitudinal direction of the second strands 20, one side sandwiching the cut was held with chucks, of a tensile testing machine,

TABLE 7

<Fastener length at each displacement of fastener by itself>

| Fastener | | | Tensile speed | Displacement | Dimension under tension | Dimension under no tension | Change in dimension under tension | Elastic deformation length | Ratio | Plastic deformation length | Ratio | |
|---|---|---|---|---|---|---|---|---|---|---|---|---|
| Brand | Material | Structure | (mm/min) | (mm) | (mm) | (mm) | (mm) | (mm) | (%) | (mm) | (%) | Note |
| S-3694-2 Example 3A | Polyester | Mesh | 100 | 0 | 170 | 170 | 0 | 0 | — | 0 | — | L0 |
| | | | | 25 | 196 | 182 | 26 | 14 | 54% | 12 | 46% | L1 |
| | | | | 50 | 220 | 190 | 50 | 30 | 60% | 20 | 40% | L2 |
| | | | | 75 | 246 | 201 | 76 | 45 | 59% | 31 | 41% | L3 |
| | | | | 100 | 270 | 210 | 100 | 60 | 60% | 40 | 40% | L4 |
| | | | | 125 | 295 | 235 | 125 | 60 | 48% | 55 | 52% | 25 |
| | | | | 150 | 320 | 251 | 150 | 69 | 46% | 31 | 54% | L6 |
| | | | | 180 | 350 | 270 | 180 | 80 | 44% | 100 | 56% | L7 |

The touch fastener 1 of Example 3A does not break even if the displacement amount is 180 mm, but its elastic deformation ratio is 44 to 54%, which is smaller than the values in Examples 1 and 2 shown in Table 4. On the other hand, its plastic deformation ratio is 40 to 56%, which is larger than the values in Examples 1 and 2. Therefore, the elongation percentage along the longitudinal direction of the second strands 20 in the touch fastener 1 of Example 3A is lower than those in Example 1 and 2, but owing to the high plastic deformation ratio, the touch fastener 1 of Example which were disposed at positions 180-degree opposite to each other, and the test piece was pulled in opposite directions to be torn. Similarly, as for the widthwise direction, a cut was made along the direction orthogonal to the second strands 20, one side and the other side sandwiching the cut were held with two chucks respectively, and the test piece was pulled in opposite directions to be torn. Table 8 shows the measurement results of Example 2 (sample No. S-3680) and Example 3B (sample No. S-3690-1).

TABLE 8

| | Material | Standard Hytrel 6377 | | | |
|---|---|---|---|---|---|
| | Die | W-124 | | W-153 | |
| | Angle | 4.13° | | 30° | |
| | Sample | S-3680 (Example 2) | | S-3690-1 (Example 3B) | |
| | Breaking direction | Lengthwise direction | Widthwise direction | Lengthwise direction | Widthwise direction |
| <Tear strength> (N) | Data | 20.6 | 4.1 | 29.3 | 54.9 |
| | | 18.6 | 3.6 | 36.0 | 53.6 |
| | | 21.1 | 3.6 | 34.8 | 54.5 |
| | Average | 20.1 | 3.7 | 33.6 | 54.3 |
| | Chart reading | Peak value | Peak value 5 point average | Peak value 5 point average | Peak value 5 point average |
| | Peel and tear state | L-shaped tear | Tear as it is | Tear as it is | Element elongation along with tearing |

TABLE 8-continued

| <Seam (shear) breaking strength> (N/25 × 2 mm) | Data | 56.9 | 131.5 | 126.5 | 67.2 |
|---|---|---|---|---|---|
| | | 48.1 | 172.7 | 91.7 | 86.8 |
| | | 52.0 | 118.2 | 127.5 | 84.4 |
| | Average | 52.3 | 140.8 | 115.2 | 79.5 |
| | Chart reading | Peak value | Peak value | Peak value | Peak value |
| | Peel and tear state | ML seam broken or ML broken | Element elongation | ML broken or thread snapped | ML broken after element elongation |

As is apparent from Table 8, in the test piece of Example 3B, the tear strength is 1.5 to 2 times in the lengthwise direction and 10 times or more in the widthwise direction, as compared with Example 2.

(Seam (Shear) Breaking Strength)

Figure 17:
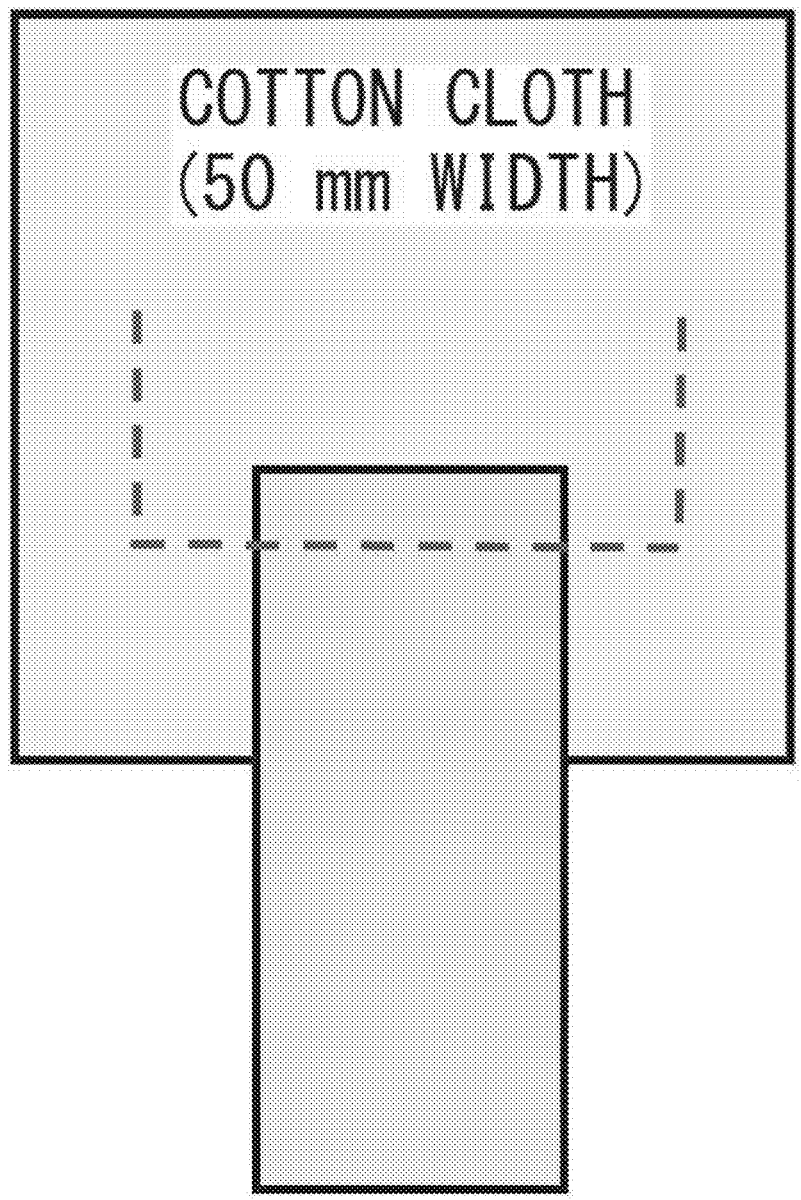
FIG. 17 is an explanatory view of a method of a seam (shear) breaking strength test conducted on test pieces of the touch fasteners of Example 2 and Example 3B.

Next, as illustrated in FIG. 17, the test piece (width of the test piece: 25 mm) of the touch fastener 1 of Example 3B is sewn to a cotton cloth at a position 2 mm-distant from an edge of the test piece in conformity with JIS L-3416. In the sewing, a No. 14 sewing-machine needle and a #30 sewing-machine thread are used, and a seam pitch is 3 mm. The cotton cloth and the touch fastener 1 are held with chucks and pulled to be broken (300 mm/min pulling speed). Table 8 shows the results in the lower columns. As the value of the seam breaking stress is smaller, it indicates that elongation occurs in the touch fastener 1, and Example 2 easily elongates in the lengthwise direction but is difficult to elongate in the widthwise direction. On the other hand, it is seen that Example 3B has the characteristic of being difficult to elongate in the lengthwise direction but easily elongating in the widthwise direction.

Examples 3B, 3C (Width-Direction Strength)

Next, regarding Example 3B (sample No. S-3690-1) and Example 3C (sample No. S-3690-2), the characteristic was found when edges on upper and lower sides, with the direction (width direction) orthogonal to the longitudinal direction of the second strands 20 being defined as the up-down direction, were held with 60 mm-spaced up and down chucks of a tensile testing machine and the test pieces were each pulled by 30 mm at 100 mm/minute. Incidentally, the test pieces each had a 20 mm length along the longitudinal direction of the second strands 20 (width of the test pieces themselves). Further, the inclination angle θ of the first strands 10 in Example 3C was 45 degrees. The same test was also conducted on Example 2 (sample No. 3680, the inclination angle θ of the first strands 10=4.13 degrees). Table 9 shows the results.

TABLE 9

| Product No. | | Strength value (N) Data | (n = 3) Strength per unit length (N/cm) |
|---|---|---|---|
| S-3680 (Example 2) | (Cut angle 4.13°) | 117.1 | 58.6 |
| | | 111.0 | 55.5 |
| | | 116.4 | 58.2 |
| | (Average) | 114.8 | 57.4 |
| S-3690-1 (Example 3B) | (Cut angle 30°) | 33.6 | 16.8 |
| | | 34.5 | 17.3 |
| | | 30.2 | 15.1 |

TABLE 9-continued

| Product No. | | Strength value (N) Data | (n = 3) Strength per unit length (N/cm) |
|---|---|---|---|
| | (Average) | 32.8 | 16.4 |
| S-3690-2 (Example 3C) | (Cut angle 45°) | 9.0 | 4.5 |
| | | 8.1 | 4.1 |
| | | 8.0 | 4.0 |
| | (Average) | 8.4 | 4.2 |

In Examples 3B and 3C, both the strength value and the strength per unit length are greatly lower than those in Example 2. This indicates that, in the direction (width direction) orthogonal to the longitudinal direction of the second strands 20, Examples 3B and 3c more easily elongate than Example 2. Further, the comparison between Example 3B and Example 3C shows that Example 3C more easily elongates in the width direction. Therefore, with the inclination angle θ of a certain degree, preferably 20 to 45 degrees, and more preferably 30 to 45 degrees, the touch fastener 1 can have the characteristic of easily elongating in the width direction.

(Diagonal-Direction Strength)

Figure 18:
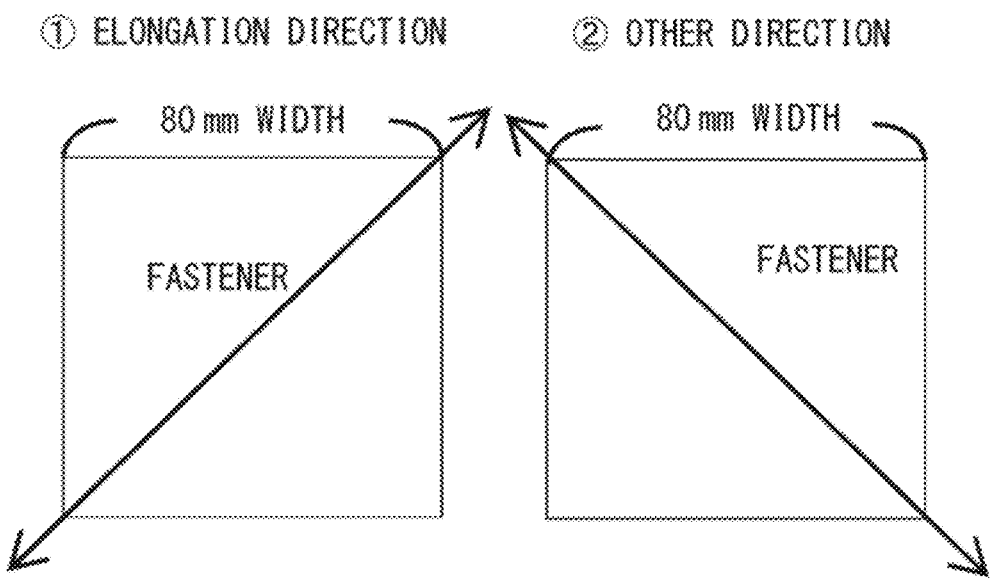
FIG. 18 is an explanatory view of a method of a diagonal-direction strength test conducted on test pieces of the touch fasteners of Example 2, Example 3B, and Example 3C.

Regarding Example 3B (sample No. S-3690-1), Example 3C (sample No. S-3690-2), and Example 2 (sample No. 3680), square test pieces whose sides were each 80 mm were fabricated as illustrated in FIG. 18, and they were pulled diagonally at a tensile speed of 100 mm/minute by 60 mm-distant upper and lower chucks of a tensile testing machine. As illustrate in FIG. 18, the test pieces were each formed so as to easily elongate along one of the two diagonal lines, and in the measurement, this direction was defined as the "elongation direction" and the direction along the other diagonal line was defined as the "other direction". Table 10 shows the results.

TABLE 10

| Product No. | | Elongation direction ① strength value (N) | Other direction ② strength value (N) | (n = 3) Strength average (N) |
|---|---|---|---|---|
| S-3680 (Example 2) | (Cut angle 4.13°) | 150.6 | 113.3 | 132.0 |
| | | 134.4 | 117.0 | 125.7 |
| | | 143.3 | 108.3 | 125.8 |
| | (Average) | 142.8 | 112.9 | 127.8 |
| S-3690-1 (Example 3B) | (Cut angle 30°) | 260.7 | 56.7 | 158.7 |
| | | 263.6 | 56.6 | 160.1 |
| | | 263.2 | 48.1 | 155.7 |
| | (Average) | 262.5 | 53.8 | 158.2 |
| S-3630-2 (Example 3C) | (Cut angle 45°) | 212.8 | 44.6 | 128.7 |
| | | 213.4 | 28.3 | 120.9 |
| | | 219.5 | 29.6 | 124.6 |
| | (Average) | 215.2 | 34.2 | 124.7 |

In Examples 3B and 3C, the strength value in the "elongation direction" is larger than that in Example 2, and a difference between the strength value in the "elongation direction" and that in the "other direction" is also larger than that in Example 2. This indicates that the direction in which the elongation easily occurs can be controlled depending on the magnitude of the inclination angle θ.

Therefore, by adjusting the inclination angle θ variously, that is, by setting the inclination angle θ to a relatively small value as in Examples 1, 2 and Example 3A, it is possible to impart a characteristic of easily elongating along the longitudinal direction of the second strands 20, and by making the inclination angle θ relatively large as in Examples 3B and 3C, it is possible to impart a characteristic of easily elongating along the width direction or the diagonal direction.

EXPLANATION OF REFERENCE SIGNS 1 touch fastener
10 first strand
20 second strand
20a cap portion
20b stem (of second strand)
30 engagement element (hook)
40 hole portion (mesh)
100 sheet-shaped molded body
110 base layer
120 lower surface-side rib
130 upper surface-side rib

The invention claimed is:

1. A mesh-type touch fastener, comprising:
a plurality of first strands arranged at intervals from one another and substantially in parallel to one another;
a plurality of second strands projecting from the first strands outward in a thickness direction of the first strands, extending along a direction intersecting with a longitudinal direction of the first strands, and arranged at intervals from one another and substantially in parallel to one another;
hole portions each surrounded by adjacent to the first strands and adjacent to the second strands; and
engagement elements projecting from the first strands to an opposite side of the second strands,
wherein the first strands, the second strands, and the engagement elements are integrally molded of a thermoplastic elastomer,
wherein the second strands each include an integrated stem and a cap portion projecting to both sides of the stem at an end portion of the stem, and both of the stem and the cap portion extend and are aligned continuously without interruption along the direction intersecting with the longitudinal direction of the first strands, which is a longitudinal direction of the second strands, and
wherein a difference of a thickness of the cap portion adjusts an elongation characteristic along the longitudinal direction of the second strands and a tear characteristic in a direction substantially orthogonal to the longitudinal direction of the second strands of the touch fastener.

2. The touch fastener according to claim 1, wherein the thickness of the cap portions is smaller than a thickness of the first strands.

3. The touch fastener according to claim 2, wherein the thickness of the cap portions is in a range of ½ to ¼ of the thickness of the first strands.

4. The touch fastener according to claim 1, wherein the thickness of the cap portions is equal to or more than a thickness of the first strands.

5. The touch fastener according to claim 4, wherein the thickness of the cap portions is in a range of one to four times the thickness of the first strands.

6. The touch fastener according to claim 1, wherein an inclination angle of the first strands to a virtual line orthogonal to the second strands is in a range of 0 to 70 degrees.

7. The touch fastener according to claim 1, wherein, in a tensile shear test in which a test piece having a length of 170 mm along the longitudinal direction of the second strands and a width of 20 mm is pulled in a shear direction at 100 mm/min while a 50 mm length along the longitudinal direction of the second strands from one edge of the test piece is engaged with a mating member through the engagement elements, a measured displacement amount of the test piece along the longitudinal direction of the second strands up to an instant when a load value in the shear direction due to an engagement of the test piece and the mating member sharply drops is 70% or more of a total length that the test piece has before being pulled.

8. The touch fastener according to claim 1, wherein a breaking-time load value when a test piece by itself is pulled along the longitudinal direction of the second strands at 100 mm/min is 1.5 times or less a load value at an instant when the load value in a shear direction due to an engagement of the test piece and a mating member sharply drops in a tensile shear test.

9. The touch fastener according to claim 1, wherein the thermoplastic elastomer is a thermoplastic polyester elastomer.

10. The touch fastener according to claim 1, wherein the touch fastener is integrally formed with a cushioning member of a seat.

11. A method of manufacturing the touch fastener according to claim 1,
the method comprising:
extrusion-molding a sheet-shaped molded body having a base layer substantially in a flat plate shape, one-side ribs extending along an extrusion direction on one surface of the base layer, and other ribs extending along the extrusion direction on the other surface of the base layer;
making cuts from tops of the other ribs down to a boundary position with the one-side ribs in the base layer, the cuts extending along a width direction orthogonal to the extrusion direction or along a direction inclined at a predetermined angle to the width direction and being a predetermined-interval spaced from one another in the extrusion direction; and
stretching the sheet-shaped molded body in the extrusion direction to form the first strands by portions, of the base layer, which are separated at positions of the cuts, form the second strands by the one-side ribs, and form the engagement elements by portions, of the other ribs, which are separated at the positions of the cuts, and
extrusion-molding the one-side ribs such that the one-side ribs each have a shape including a portion which is to form the stem of the second strand and a portion which is to form the cap portion projecting to both sides at the end portion of the stem, and manufacturing the touch fasteners different in an elongation characteristic along the extrusion direction and in tear strength in the direction substantially orthogonal to the extrusion direction by varying a thickness of the cap portion which are to form the cap portion at a time of the extrusion molding.

12. The method of manufacturing the touch fastener according to claim 11, wherein the thickness of the portions, of the one-side ribs, which form the cap portions of the second strands, is smaller than a thickness of the base layer for the first strands.

13. The method of manufacturing the touch fastener according to claim 11, wherein the thickness of the portions, of the one-side ribs, which are to form the cap portions of the second strands, is equal to or more than a thickness of the base layer for the first strands.

\* \* \* \* \*